(12) United States Patent
Pacella et al.

(10) Patent No.: US 9,545,941 B2
(45) Date of Patent: Jan. 17, 2017

(54) INFANT STROLLER APPARATUS

(71) Applicant: Wonderland Nurserygoods Company Limited, Kwai Chung, N.T. (HK)

(72) Inventors: Jonathan M. Pacella, Coatesville, PA (US); Andrew J. Winterhalter, West Lawn, PA (US); Nathanael Saint, Morgantown, PA (US); William B. Bellows, Wyomissing, PA (US); Jerry S. Ingraham, Denver, PA (US)

(73) Assignee: Wonderland Nurserygoods Company Limited, Hong Kong (HK)

( * ) Notice: Subject to any disclaimer, the term of this patent is extended or adjusted under 35 U.S.C. 154(b) by 0 days.

(21) Appl. No.: 14/790,091

(22) Filed: Jul. 2, 2015

(65) Prior Publication Data

US 2016/0001805 A1    Jan. 7, 2016

Related U.S. Application Data

(60) Provisional application No. 61/998,674, filed on Jul. 3, 2014, provisional application No. 62/097,925, filed on Dec. 30, 2014, provisional application No. 62/176,896, filed on Mar. 23, 2015.

(51) Int. Cl.
| | |
|---|---|
| *B62B 9/02* | (2006.01) |
| *B62B 7/00* | (2006.01) |
| *B62B 7/06* | (2006.01) |
| *B62B 9/20* | (2006.01) |
| *B62B 7/08* | (2006.01) |
| *B62B 7/14* | (2006.01) |
| *B62B 9/28* | (2006.01) |

(Continued)

(52) U.S. Cl.
CPC .............. *B62B 9/02* (2013.01); *B62B 7/008* (2013.01); *B62B 7/06* (2013.01); *B62B 7/08* (2013.01); *B62B 7/142* (2013.01); *B62B 7/145* (2013.01); *B62B 9/20* (2013.01); *B62B 9/28* (2013.01); *B62B 5/087* (2013.01); *B62B 9/102* (2013.01)

(58) Field of Classification Search
CPC ............ B62B 7/00; B62B 7/006; B62B 7/008; B62B 7/02; B62B 7/04; B62B 7/06
See application file for complete search history.

(56) References Cited

U.S. PATENT DOCUMENTS

| | | | | |
|---|---|---|---|---|
| 3,061,328 A | * | 10/1962 | Konar | ..................... B62B 7/123 280/47.18 |
| 5,622,375 A | * | 4/1997 | Fairclough | ................ B62B 9/26 280/47.38 |
| 6,422,634 B2 | * | 7/2002 | Lundh | ......................... 280/32.7 |

(Continued)

FOREIGN PATENT DOCUMENTS

CN           200999058 Y        1/2008

*Primary Examiner* — Erez Gurari
(74) *Attorney, Agent, or Firm* — Baker & McKenzie LLP; David I. Roche

(57) ABSTRACT

An infant stroller apparatus includes a stroller frame having a leg frame, a stand platform pivotally connected with the leg frame about a pivot axis, and a spring connected with the leg frame. The stand platform is connected with a caster assembly disposed rearward relative to the pivot axis. The spring is configured to bias the stand platform in a direction for displacing the caster assembly downward. In some embodiment, the infant stroller apparatus can include a brake assembly operable to lift the caster assembly of the stand platform in a braking state.

23 Claims, 27 Drawing Sheets

(51) Int. Cl.
*B62B 9/10* (2006.01)
*B62B 5/08* (2006.01)

(56) References Cited

U.S. PATENT DOCUMENTS

| | | | | |
|---|---|---|---|---|
| 6,530,591 B2* | 3/2003 | Huang | ..................... | B62B 7/123 |
| | | | | 280/47.38 |
| 7,004,272 B1* | 2/2006 | Brown | ..................... | B60K 1/00 |
| | | | | 180/65.1 |
| 8,029,007 B2* | 10/2011 | Jones | ..................... | B62D 63/00 |
| | | | | 280/204 |
| 2004/0164510 A1* | 8/2004 | Zhuang | ..................... | B62B 9/28 |
| | | | | 280/63 |
| 2007/0090619 A1* | 4/2007 | Lundh | ....................... | B62B 9/12 |
| | | | | 280/63 |
| 2012/0098237 A1* | 4/2012 | Winterhalter | ........... | B62B 7/008 |
| | | | | 280/647 |
| 2013/0234419 A1* | 9/2013 | Yang | ........................ | B62B 9/12 |
| | | | | 280/650 |
| 2013/0264787 A1* | 10/2013 | Cheng | ..................... | B62B 7/142 |
| | | | | 280/47.38 |
| 2016/0001805 A1* | 1/2016 | Pacella | ..................... | B62B 9/02 |
| | | | | 280/47.38 |

* cited by examiner

INFANT STROLLER APPARATUS

CROSS-REFERENCE TO RELATED APPLICATION(S)

This application respectively claims priority to U.S. Provisional Patent Application No. 61/998,674 filed on Jul. 3, 2014; to U.S. Provisional Patent Application No. 62/097,925 filed on Dec. 30, 2014; and to U.S. Provisional Patent Application No. 62/176,896 filed on Mar. 23, 2015, the disclosures of which are incorporated herein by reference.

BACKGROUND

1. Field of the Invention

The present invention relates to infant stroller apparatuses.

2. Description of the Related Art

Presently, there are many double strollers on the market. Some double strollers may include two seats placed side by side, while others may have a front seat and a rear seat placed behind the front seat. Usually, the seats of a double stroller are permanently attached to the stroller frame, some of them allowing the installation of one or two infant car seats in the area of the seats. Because the seats are permanently attached to the stroller frame, the conventional double strollers have limited seating options. Moreover, the increased length of the double stroller may render it more difficult to maneuver.

Therefore, there is a need for an infant stroller apparatus that is more flexible in use, and address at least the foregoing issues.

SUMMARY

The present application describes an infant stroller apparatus that can accommodate multiple seats and offer more convenient options for installing the seats. In one embodiment, the infant stroller apparatus includes a stroller frame including a leg frame, a stand platform pivotally connected with the leg frame about a pivot axis, and a spring connected with the leg frame. The stand platform is connected with a caster assembly disposed rearward relative to the pivot axis. The spring is configured to bias the stand platform in a direction for displacing the caster assembly downward.

In another embodiment, the infant stroller apparatus includes a stroller frame including a leg frame, a stand platform connected with the leg frame, and a wheel assembly connected with the leg frame, and an actuator assembled with the leg frame. The stand platform is connected with a caster assembly. The wheel assembly includes a wheel axle movably assembled with the leg frame, and the leg frame is movable with the stand platform and the caster assembly relative to the wheel axle between an upper position and a lower position, the actuator being operable to displace the wheel axle relative to the leg frame for switching between the upper position and the lower position.

Advantages of the infant stroller apparatus described herein include the ability to provide a stroller frame that can receive at least two detachable seats in multiple seating configurations according to the caregiver's needs, and is easy to maneuver.

DETAILED DESCRIPTION OF THE EMBODIMENTS

Figure 1:
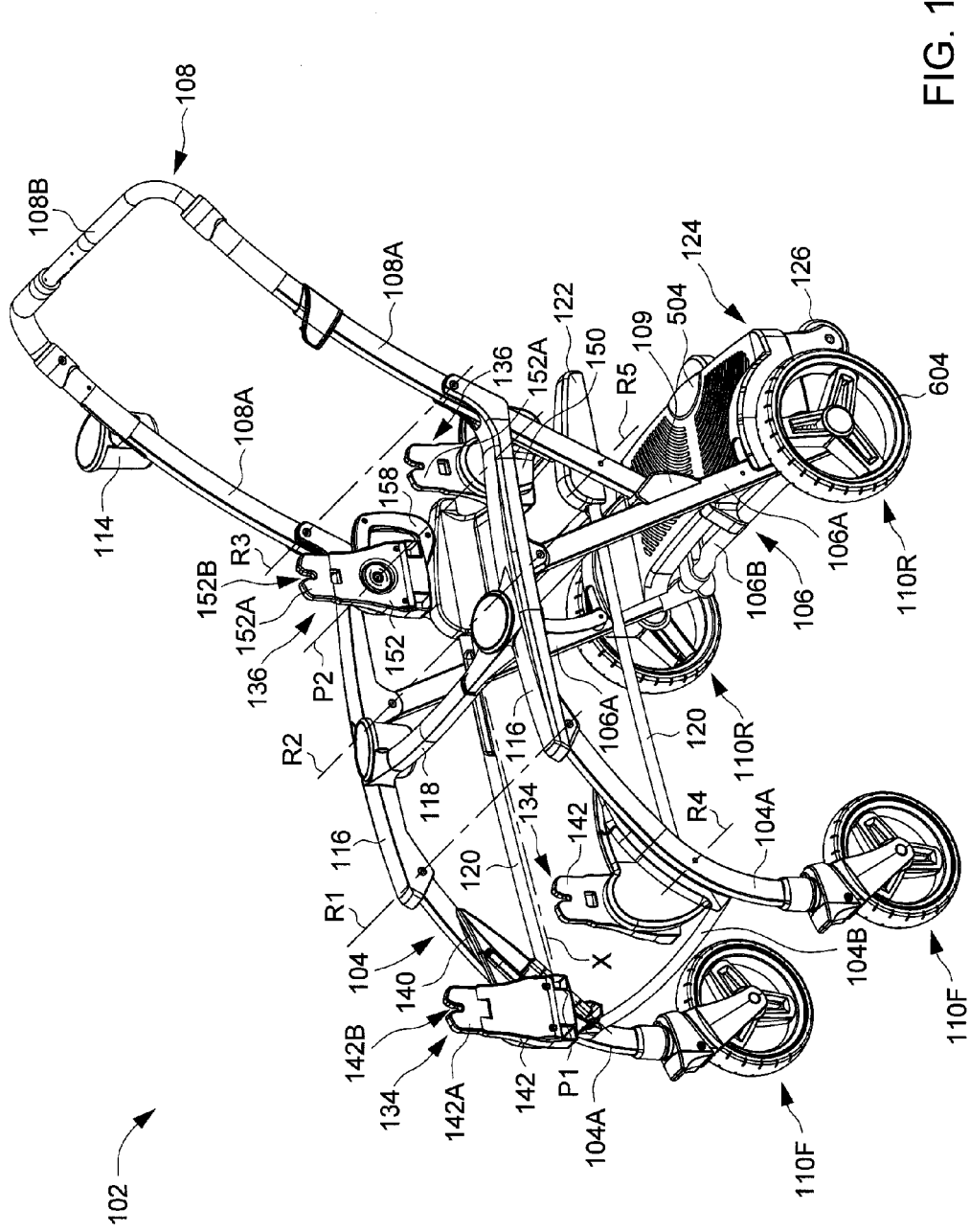
FIG. 1 is a perspective view illustrating a stroller frame of an infant stroller apparatus.
Figure 2:
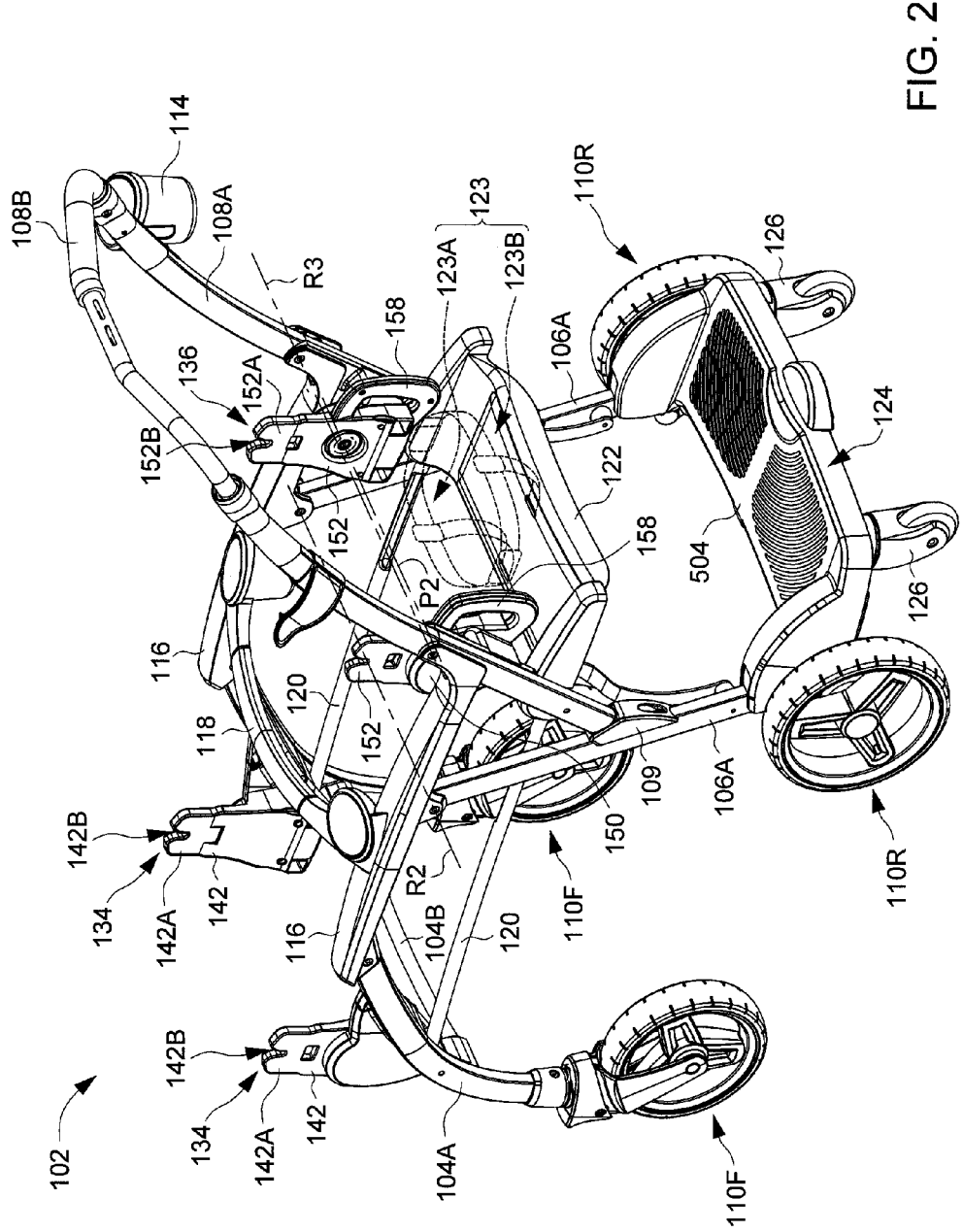
FIG. 2 is another perspective view illustrating the stroller frame shown FIG. 1.
Figure 3:
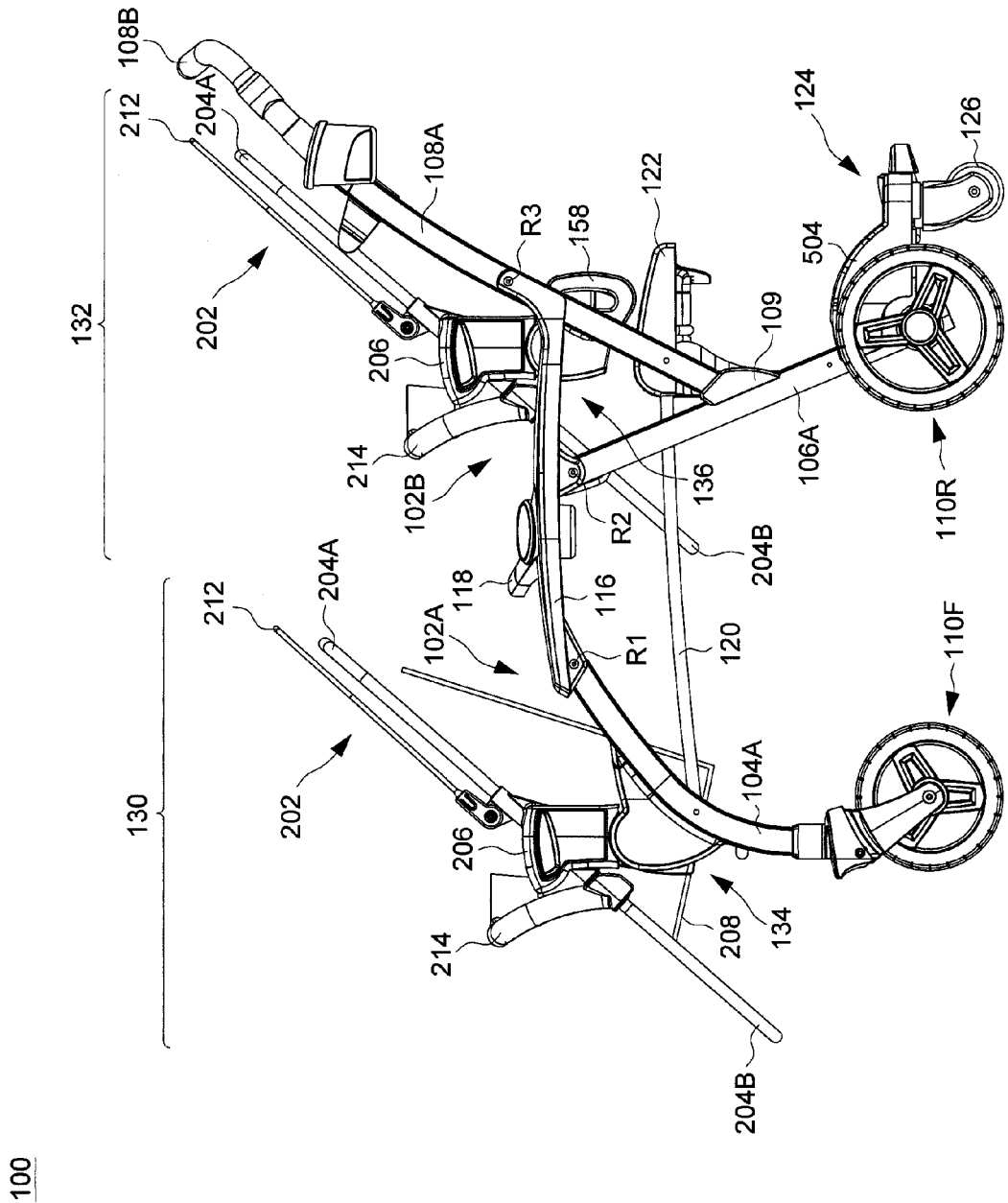
FIG. 3 is a schematic view illustrating the infant stroller apparatus of FIG. 1 having two detachable seats installed thereon.

FIGS. 1-3 are schematic views illustrating an embodiment of an infant stroller apparatus 100 capable of receiving a plurality of detachable seats. The infant stroller apparatus 100 can include a stroller frame 102 on which the detachable seats may be desirably attached. The stroller frame 102 can include a front leg frame 104, a rear leg frame 106 and a handle frame 108. The front and rear leg frames 104 and 106 can be respectively formed by the assembly of one or multiple tubular segments. For example, the front leg frame 104 can include two front leg segments 104A respectively disposed at a left and a right side of the stroller frame 102, and a transversal segment 104B connected with the two front leg segments 104A. The rear leg frame 106 can include two rear leg segments 106A respectively disposed at the left and right sides of the stroller frame 102, and a transversal segment 106B connected with the two rear leg segments 106A. Lower end portions of the front and rear leg frames 104 and 106 can be respectively provided with wheel assemblies 110F and 110R. Moreover, the two front leg segments 104A of the front leg frame 104 and the two rear leg segments 106A of the rear leg frame 106 can sideways delimit a central space for arrangement of multiple seats.

The handle frame 108 can be formed by the assembly of one or more tubular segments. For example, the handle frame 108 can include two handle segments 108A respectively disposed at the left and right sides of the stroller frame 102, and a transversal segment 108B connected with the two handle segments 108A. A cup holder 114 may be connected with one of the handle segments 108A at an elevated position. A lower end portion of each handle segment 108A can abut against a coupling socket 109 affixed with the corresponding rear leg segment 106A. The handle segment 108A can rest adjacent to the coupling socket 109 when the stroller frame 102 is in the unfolded state (as shown in FIGS. 1 and 2), and can move away from the coupling socket 109 when the stroller frame 102 is folded to a collapse state (not shown).

Referring again to FIGS. 1 and 2, the stroller frame 102 can further include two side segments 116 respectively arranged at the left and right sides of the stroller frame 102. The side segment 116 at each of the left and right sides is respectively connected pivotally with an upper end of the front leg segment 104A about a pivot axis R1, with an upper end of the rear leg segment 106A about a pivot axis R2, and with an intermediate portion of the handle segment 108A about a pivot axis R3. The pivot axes R1, R2 and R3 extend transversally from the left to right side of the stroller frame 102, the pivot axis R2 being located between the pivot axes R1 and R3 along a lengthwise axis X extending from a rear to a front of the stroller frame 102, and the pivot axis R3 being arranged higher than the pivot axes R1 and R2.

In some embodiments, intermediate regions of the two side segments 116 can further be affixed with a crossbar 118 that extends transversally from the left to right side of the stroller frame 102. The crossbar 118 can be connected with each side segment 116 at a location between the pivot axes R1 and R2, in particular near the pivot axis R2. The crossbar 118 can be provided as a guard member adding protection for a seat installed on the stroller frame 102 in a rear position. Moreover, cup holders may be affixed with the crossbar 118, e.g., for use by a child sitting in the rear position.

Referring to FIGS. 1 and 2, the stroller frame 102 can further include two other side segments 120 respectively arranged at the left and right sides of the stroller frame 102 below the two side segments 116. The side segment 120 at each of the left and right sides is respectively connected pivotally with the front leg segment 104A about a pivot axis R4 located below the pivot axis R1, and with the handle segment 108A about a pivot axis R5 located below the pivot axis R3. The side segments 120 can be attached with a storage basket (not shown). Moreover, respective rear portions of the two side segments 120 can be affixed with a bench seat 122, which can provide sitting support for a child facing forward or rearward.

Referring to FIG. 2, in some embodiments, the bench seat 122 can be provided with a harness 123 (shown with phantom lines in FIG. 2) that can be used for securing a child sitting thereon. The harness 123 can include two sets of webbing sections 123A and 123B that can be connected with each other by two buckles. Each of the two webbing sections 123A and 123B can have a crotch strap and a waist strap, the waist straps of the two webbing sections 123A and 123B being connectable with each other via buckles. The harness 123 can be used to secure a child sitting on the bench seat 122 either facing forward or rearward.

Referring again to FIGS. 1 and 2, the infant stroller apparatus 100 can further include a stand platform 124 arranged at a rear and bottom of the stroller frame 102. The stand platform 124 can be connected with the transversal segment 106B of the rear leg frame 106. For stable support, the stand platform 124 can be provided with two caster assemblies 126 arranged behind the wheel assemblies 110R of the rear leg frame 106.

In conjunction with FIGS. 1 and 2, FIG. 3 is a schematic view illustrating the stroller frame 102 installed with two detachable seats 130 and 132. The stroller frame 102 described herein can receive the installation of the two detachable seats 130 and 132 (e.g., two stroller seats 202) in two positions that are spaced apart from each other along the lengthwise axis X. To this purpose, the infant stroller apparatus 100 can include two seat mounts 134 respectively arranged at the left and right sides near a front of the stroller frame 102, and two seat mounts 136 respectively arranged at the left and right sides behind the seat mounts 134 and near a rear of the stroller frame 102. More specifically, the two seat mounts 134 can be respectively affixed with the two front leg segments 104A of the stroller frame 102, and the two seat mounts 136 can be spaced apart from the two seat mounts 134 and respectively affixed with the handle segments 108A. The two seat mounts 134 can detachably engage with the first seat 130 in a front seat area 102A located in front of the crossbar 118, and the two seat mounts 136 can detachably engage with the second seat 132 in a rear seat area 102B behind the crossbar 118.

In one embodiment, the seat mounts 136 can be arranged above the bench seat 122 and extend higher than the seat mounts 134 while the infant stroller apparatus 100 is in the unfolded state. Owing to the height difference between the seat mounts 134 and the seat mounts 136, the second seat 132 placed in the rear position can rise higher than the first seat 130 placed in the front position, which can improve visibility for the child sitting on the second seat 132.

Figure 4:
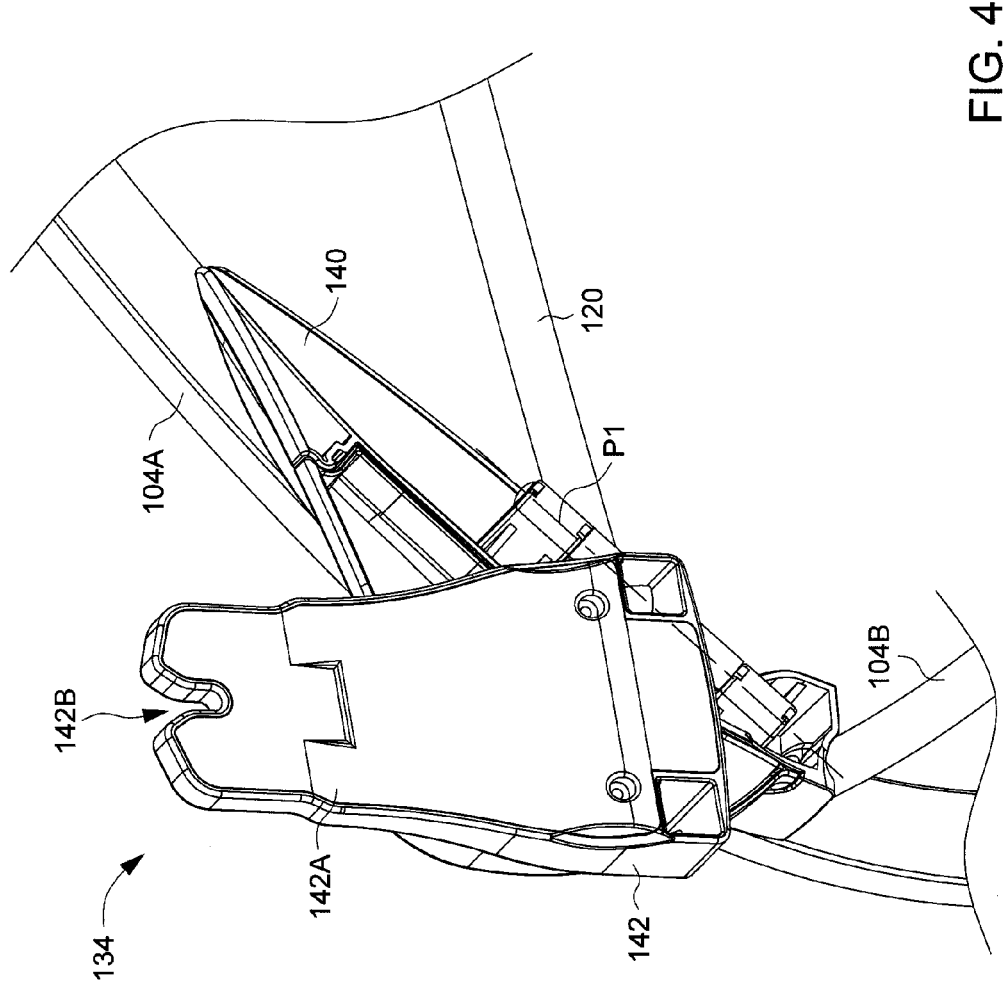
FIG. 4 is a schematic view illustrating a seat mount provided in the stroller frame shown in FIG. 1.

The two seat mounts 134 disposed at the left and right sides of the stroller frame 102 can be similar in construction. In conjunction with FIGS. 1 and 2, FIG. 4 is an enlarged view illustrating one seat mount 134. The seat mount 134 can include a bracket 140 affixed with one corresponding front leg segment 104A, and a mount portion 142 pivotally connected with the bracket 140 about a pivot axis P1. The mount portion 142 can have an elongated and generally symmetrical shape 142A provided with a notch 142B, and can detachably engage with any of a stroller frame or an infant car seat.

Figure 5:
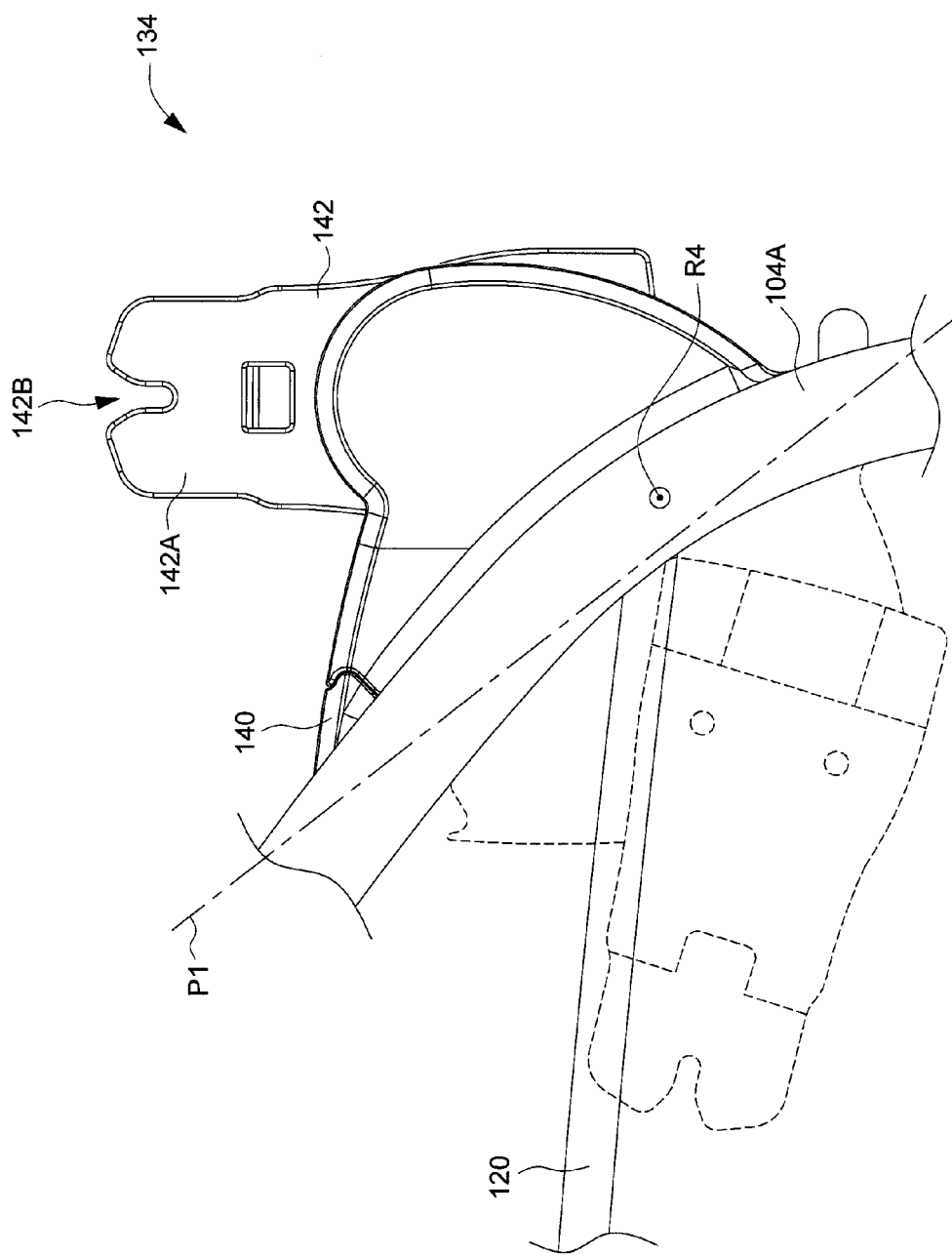
FIG. 5 is a schematic view illustrating adjustment of the seat mount shown in FIG. 4 between a deployed state and a stowed state.

As better shown in FIG. 1, the pivot axes P1 of the mount portions 142 can extend up and down generally parallel to the left and right sides of the stroller frame 102. In one embodiment, the pivot axes P1 may be exemplary inclined at an angle relative to a vertical axis. The mount portions 142 are respectively rotatable about the pivot axes P1 between a deployed state for installation of the seat 130, and a stowed state for facilitating storage of the stroller frame 102. FIG. 5 is a schematic view illustrating the mount portion 142 in the deployed and stowed state. When it is positioned in the deployed state (shown with solid lines in FIG. 5), the mount portion 142 is deployed to a forward position relative to the front leg segment 104A and extends substantially vertical and upward from the bracket 140. When it is in the stowed state (shown with phantom lines in FIG. 5), the mount portion 142 is retracted toward the front leg segment 104A to a position extending behind the front leg segment 104A. The orientation of the mount portion 142 in the stowed state can disable the mount of a seat thereon.

The two seat mounts 136 disposed at the left and right sides of the stroller frame 102 can also be similar in construction. In conjunction with FIGS. 1 and 2, FIGS. 6-8 are various schematic views illustrating the construction and operation of one seat mount 136. The seat mount 136 can include a bracket 150 affixed with one corresponding handle segment 108A, a mount portion 152 pivotally connected with the bracket 150, and a spring 154. The bracket 150 can be connected with the handle segment 108A in a region between the two pivot axes R3 and R5. The bracket 150 can have an inner cavity 150A in which is provided a shaft portion 150B. The shaft portion 150B can define a pivot axis P2 about which the mount portion 152 is pivotally connected with the bracket 150. As better shown in FIG. 1, the pivot axis P2 can extend transversally from the left to right side of the stroller frame 102, and the two mount portions 152 can be pivotally assembled generally about the same pivot axis P2 for rotation in two respective planes generally parallel to the left and right sides of the stroller frame 102. Moreover, the inner cavity 150A of the bracket 150 can further include a plurality of teeth 150C disposed around the shaft portion 150B.

The mount portion 152 can have an elongated and generally symmetrical shape 152A that has a notch 152B and can detachably engage with any of a stroller frame or an infant car seat. Moreover, the mount portion 152 has a plurality of teeth 152C that can engage with the teeth 150C of the bracket 150, and is further affixed with a handle 158. The handle 158 can protrude from a side edge of the mount portion 152, and can have any suitable shapes that can be grasped with a hand. Moreover, the handle 158 can rotate in unison with the mount portion 152 about the pivot axis P2.

In addition to pivotal movements, the assembly of the mount portion 152 with the bracket 150 can further allow the mount portion 152 to slide transversally along the pivot axis P2 away from or toward the bracket 150 between an unlocked and a locked position. More specifically, the mount portion 152 can slide along the pivot axis P2 between an unlocked position where the teeth 152C are disengaged from the teeth 150C of the bracket 150 for allowing rotation of the mount portion 152 relative to the bracket 150, and a locked position where the teeth 152C are engaged with the teeth 150C of the bracket 150 to rotationally lock the mount portion 152 with the bracket 150.

The spring 154 can have two ends respectively connected with the bracket 150 and the mount portion 152. The spring 154 can bias the mount portion 152 toward the locked position engaged with the bracket 150.

Figure 6:
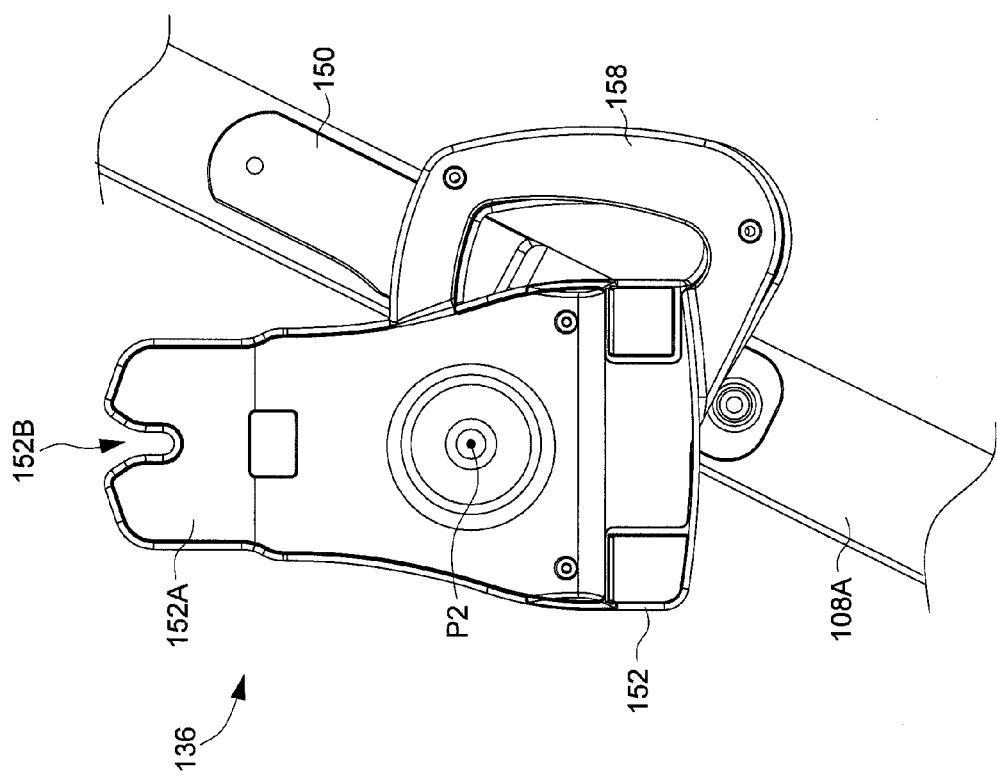
FIG. 6 is a schematic view illustrating another seat mount provided in the stroller frame shown in FIG. 1.
Figure 7:
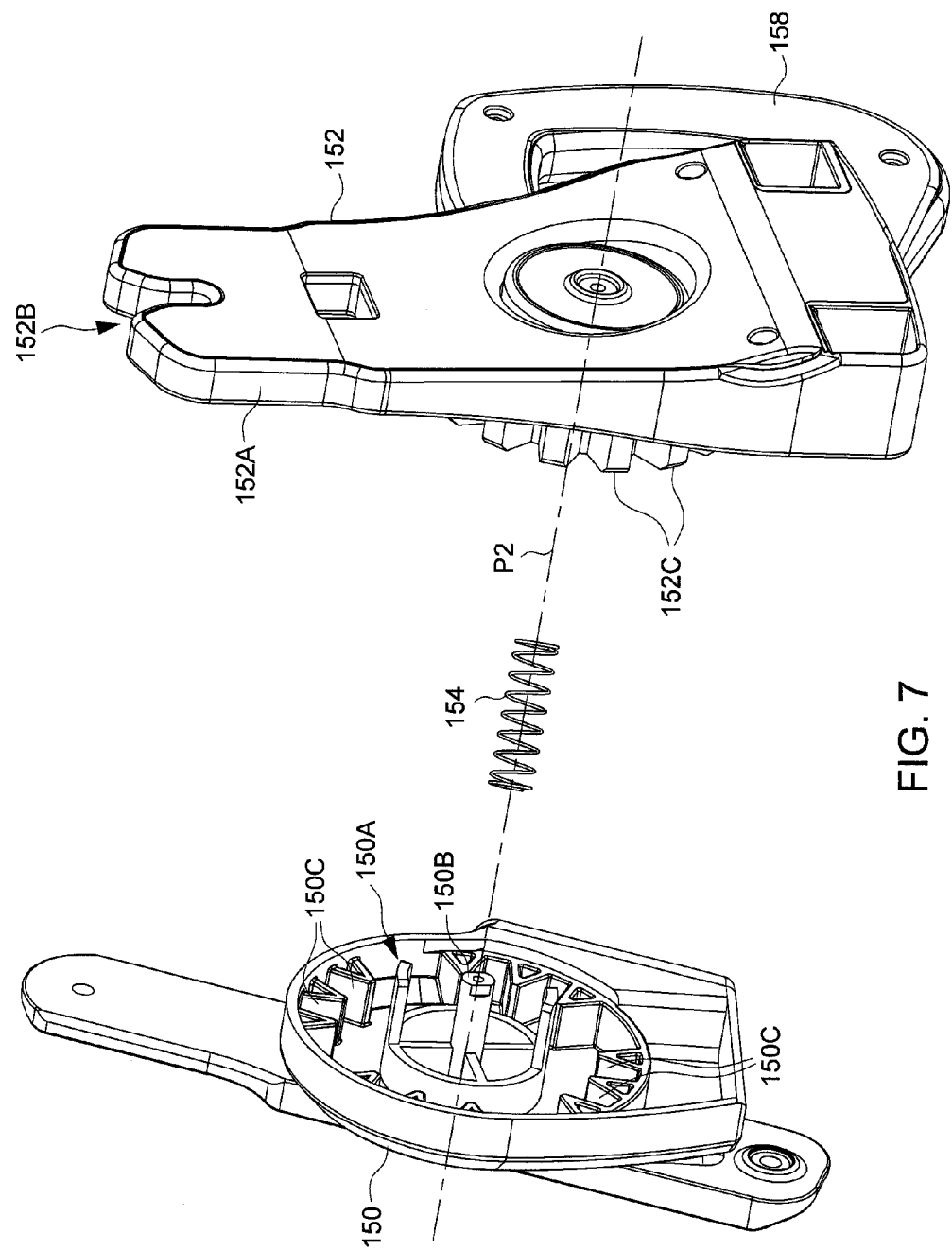
FIG. 7 is an exploded view illustrating the seat mount shown in FIG. 6.
Figure 8:
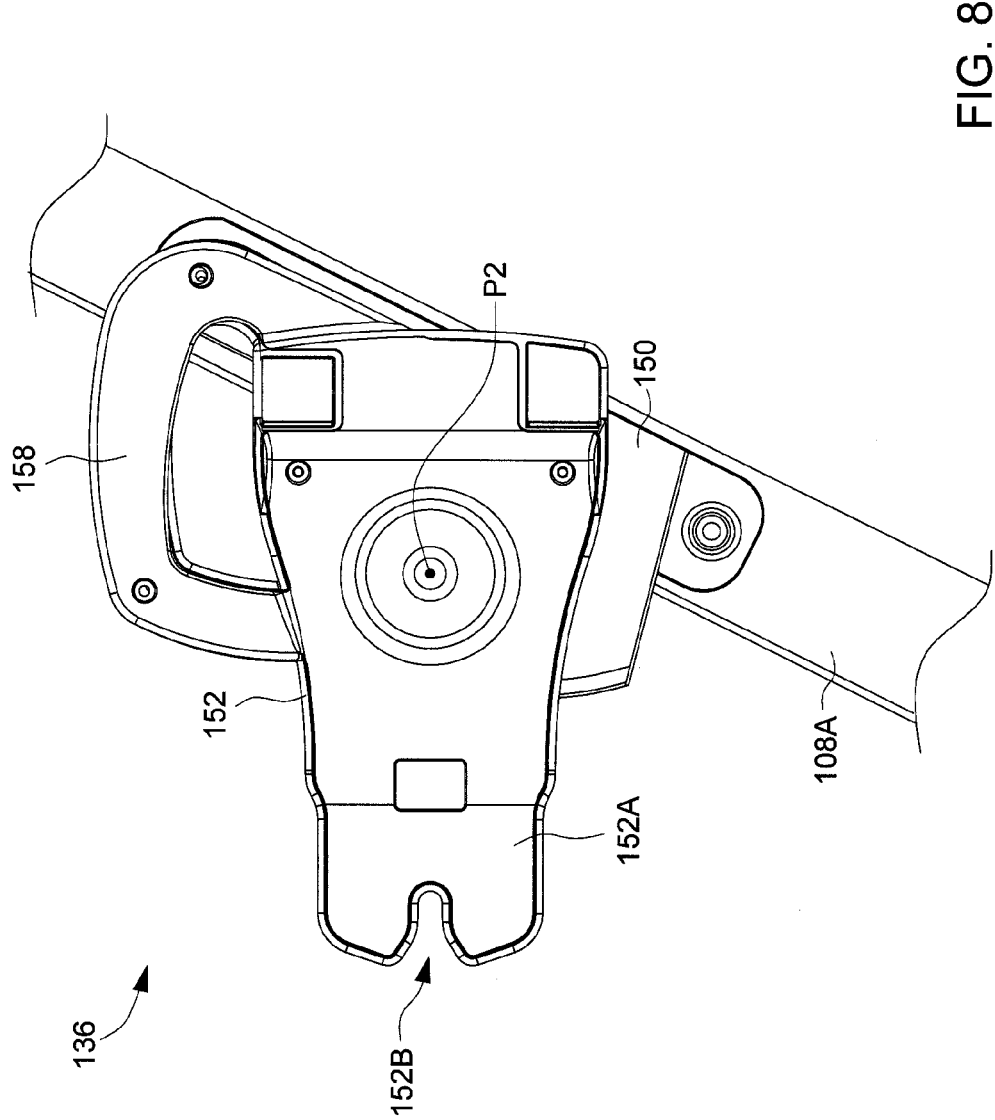
FIG. 8 is a schematic view illustrating the seat mount shown in FIG. 6 in a stowed state.

Each of the two mount portions 152 can rotate independently about the pivot axis P2 between a deployed state for installation of the seat 132, and a stowed state for facilitating storage of the stroller frame 102. FIGS. 6 and 8 are schematic views respectively illustrating the mount portion 152 in the deployed and stowed state. When it is positioned in the deployed state shown in FIG. 6, the mount portion 152 is deployed to a forward position relative to the handle segment 108A and extends substantially vertical and upward above the pivot axis P2 and the handle 158. Meanwhile, the handle 158 protrudes rearward with respect to the mount portion 152 and the pivot axis P2. Under the biasing action applied by the spring 154, the teeth 152C of the mount portion 152 can engage with the teeth 150C of the bracket 150 to keep the mount portion 152 locked in the deployed state.

For stowing the mount portion 152, a caregiver can pull the mount portion 152 to slide transversally along the pivot axis P2 away from the bracket 150, which can disengage the teeth 152C of the mount portion 152 from the teeth 150C of the bracket 150. The mount portion 152 is thereby unlocked, and then can be rotated downward about the pivot axis P2 to the stowed state. The handle 158 can rotate along with the mount portion 152 from the deployed state to the stowed state. When the mount portion 152 has reached the stowed position, the caregiver can release the mount portion 152. The mount portion 152 then can be urged by the spring 154 to slide along the pivot axis P2 toward the bracket 150 so as to have the teeth 152C engaged with the teeth 150C of the bracket 150. The mount portion 152 can be thereby locked in the stowed state, which is shown in FIG. 8. In the stowed state, the mount portion 152 can extend rearward from the pivot axis P2 and slightly incline downward, which can disable the mount of a seat thereon.

While the mount portion 152 is in the stowed state, the handle 158 protrudes upward above the pivot axis P2 and the mount portion 152. In this configuration, a child standing on the stand platform 124 facing the front of the stroller frame 102, or sitting on the bench seat 122 can grasp the two handles 158 for support.

Figure 9:
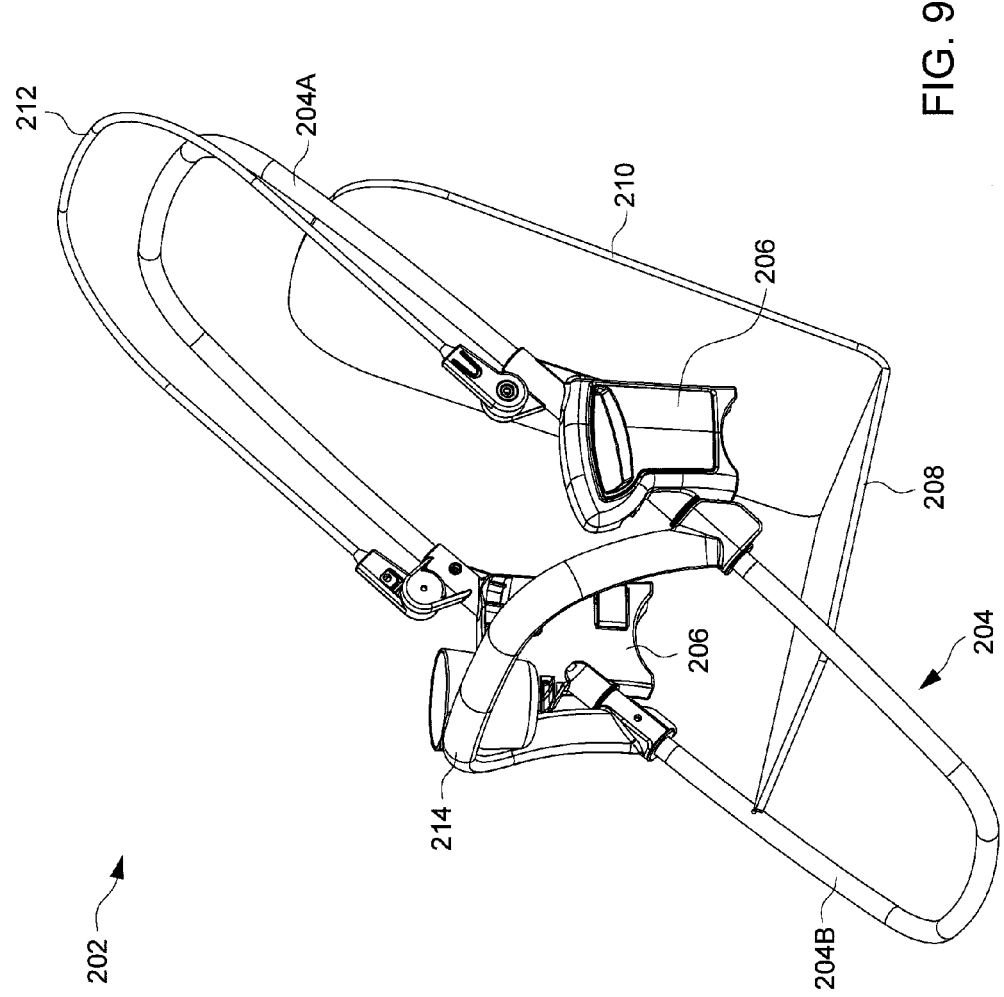
FIG. 9 is a schematic view illustrating an example of a stroller seat installable in the infant stroller apparatus shown in FIG. 1.

Different types of detachable seats may be installed on the seat mounts 134 and 136. FIG. 9 is a schematic view illustrating a stroller seat 202 that can be installed on any of the seat mounts 134 and 136 of the stroller frame 102. The stroller seat 202 can exemplary include a rigid seat frame 204, two sockets 206, a seat portion 208 and a backrest 210. The seat frame 204 can be exemplary formed by a tubular assembly, and can include an upper and a lower frame portion 204A and 204B. At the left and right side of the seat frame 204, the two sockets 206 can be respectively affixed with the upper and lower frame portions 204A and 204B. The upper frame portion 204A can extend rearward and upward from the two sockets 206, and the lower frame portion 204B can extend forward and downward from the two sockets 206. The seat portion 208 can be supported by the seat frame 204, and the backrest 210 may be pivotally connected with the seat portion 208. Additional utility features provided on the stroller seat 202 can exemplary include a canopy frame 212 that is pivotally connected with the upper frame portion 204A, and a front guard member 214 extending transversally and affixed with the lower frame portion 204B. The sockets 206 can respectively receive the engagement of the mount portions 142 of the seat mounts 134 when the stroller seat 202 is installed in the front seat area 102A, or the engagement of the mount portions 152 of the seat mounts 136 when the stroller seat 202 is installed in the rear seat area 102B. Owing to the symmetrical shapes of the mount portions 142 and 152, the stroller seat 202 can be installed facing forward or rearward in any of the front seat area 102A and the rear seat area 102B.

Figure 10:
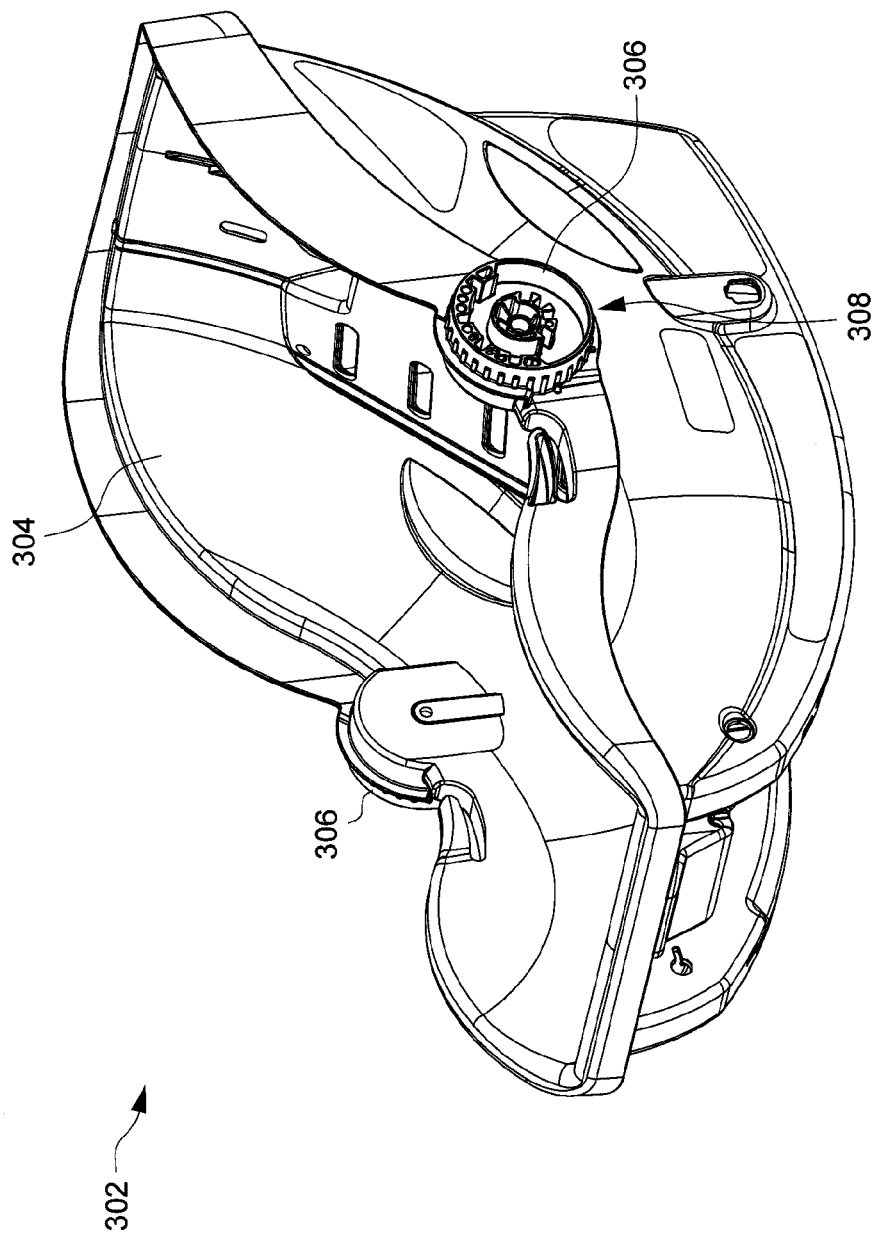
FIG. 10 is a schematic view illustrating an example of an infant car seat installable in the infant stroller apparatus shown in FIG. 1.

FIG. 10 is a schematic view illustrating an infant car seat 302 that can be installed on any of the seat mounts 134 and 136 of the stroller frame 102. The infant car seat 302 can include a seat shell 304 having a left and a right side respectively affixed with coupling rings 306 for pivotally connecting a carrying handle (not shown). The seat shell 304 can further include two sockets 308 respectively arranged at an inner side of the coupling rings 306. The sockets 308 can respectively receive the engagement of the mount portions 142 of the seat mounts 134 when the infant car seat 302 is installed in the front seat area 102A, or the engagement of the mount portions 152 of the seat mounts 136 when the infant car seat 302 is installed in the rear seat area 102B. Like the stroller seat 202, the infant car seat 302 may be installed facing forward or rearward in any of the front seat area 102A and the rear seat area 102B.

In conjunction with FIG. 3, FIGS. 11-16 are schematic views illustrating some exemplary configurations of seat installations on the stroller frame 102 of the infant stroller apparatus 100. In FIG. 3, the infant stroller apparatus 100 is shown as exemplary having two stroller seats 202 respectively engaged with the seat mounts 134 and 136 in the front and rear seat areas 102A and 102B. Both the two stroller seats 202 are arranged facing forward on the stroller frame 102. The position of the crossbar 118 between the seat mounts 134 and the seat mounts 136 can prevent the backrest 210 of the front stroller seat 202 from encroaching into the rear seat area 102B.

Figure 11:
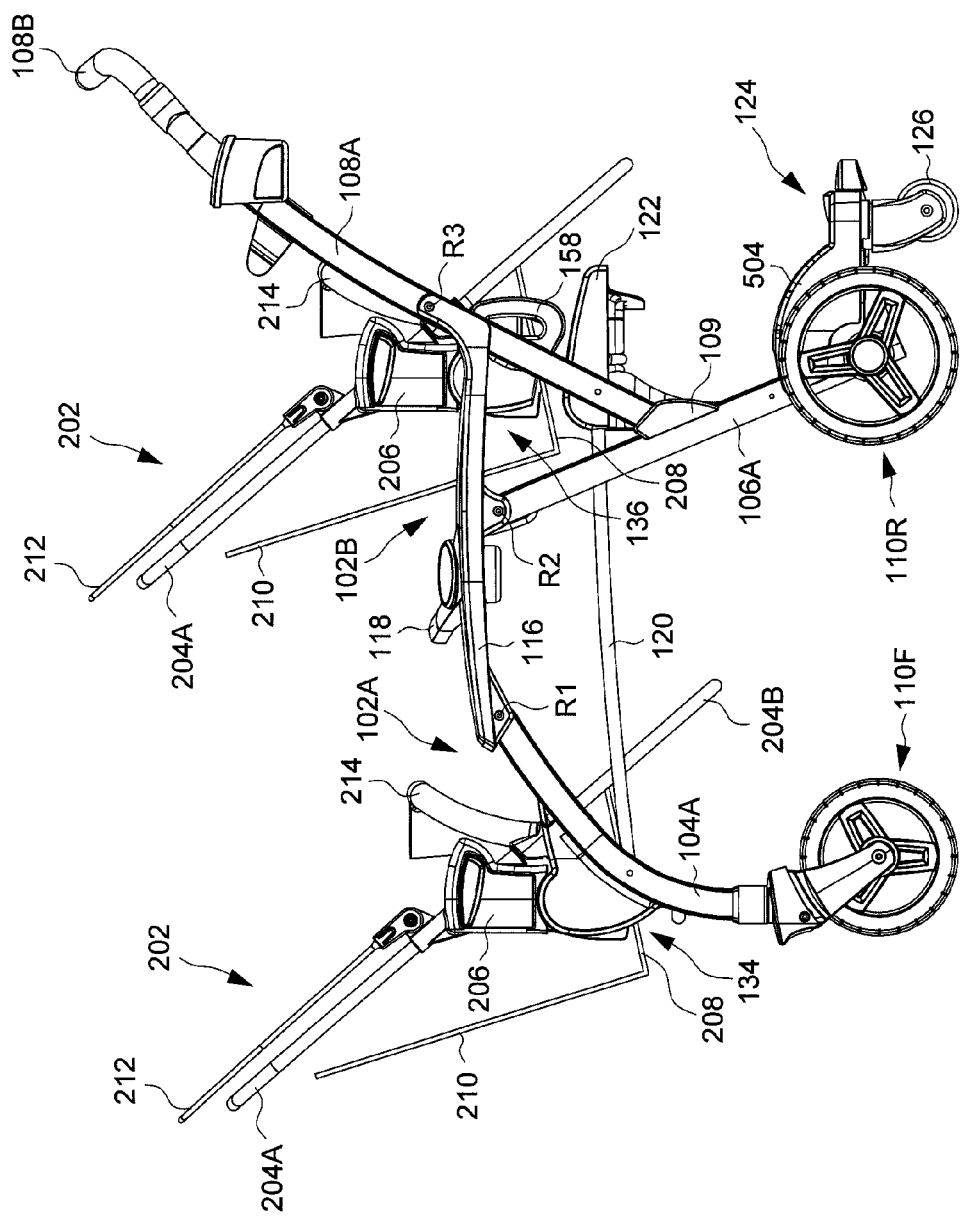
FIG. 11 is a schematic view illustrating a configuration of the infant stroller apparatus including two stroller seats installed facing rearward.

In FIG. 11, the infant stroller apparatus 100 is shown as having two stroller seats 202 respectively engaged with the seat mounts 134 and 136 in the front and rear seat areas 102A and 102B. Both the two stroller seats 202 are arranged facing rearward.

Figure 12:
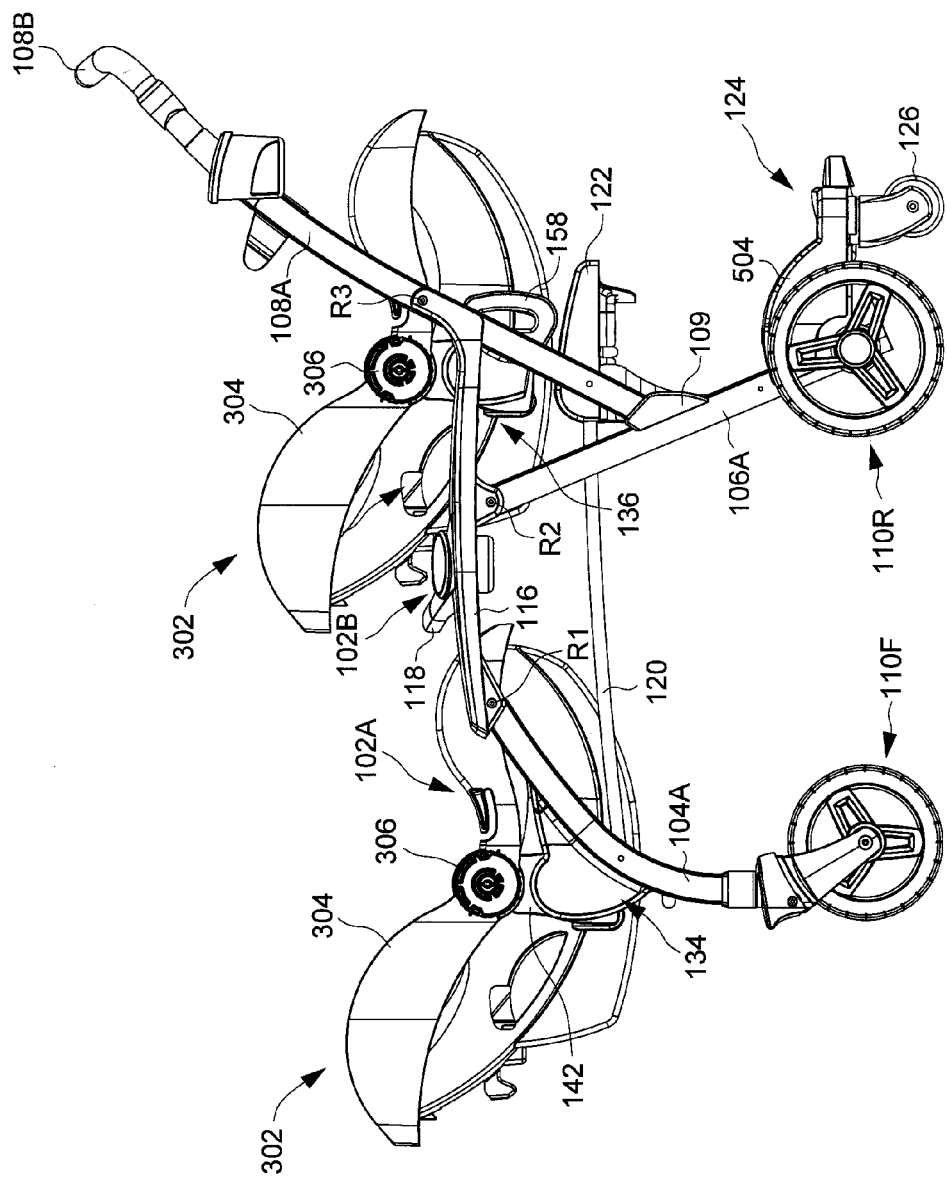
FIG. 12 is a schematic view illustrating another configuration of the infant stroller apparatus having two infant car seats installed facing rearward.

In FIG. 12, the infant stroller apparatus 100 is shown as having two infant car seats 302 respectively engaged with the seat mounts 134 and 136 in the front and rear seat areas 102A and 102B. Both the infant car seats 302 are arranged facing rearward on the stroller frame 102. The position of the crossbar 118 between the seat mounts 134 and the seat mounts 136 can fill the clearance between the two infant car seats 302, and help to contain a child in the infant car seat 302 placed in the front seat area 102A.

Figure 13:
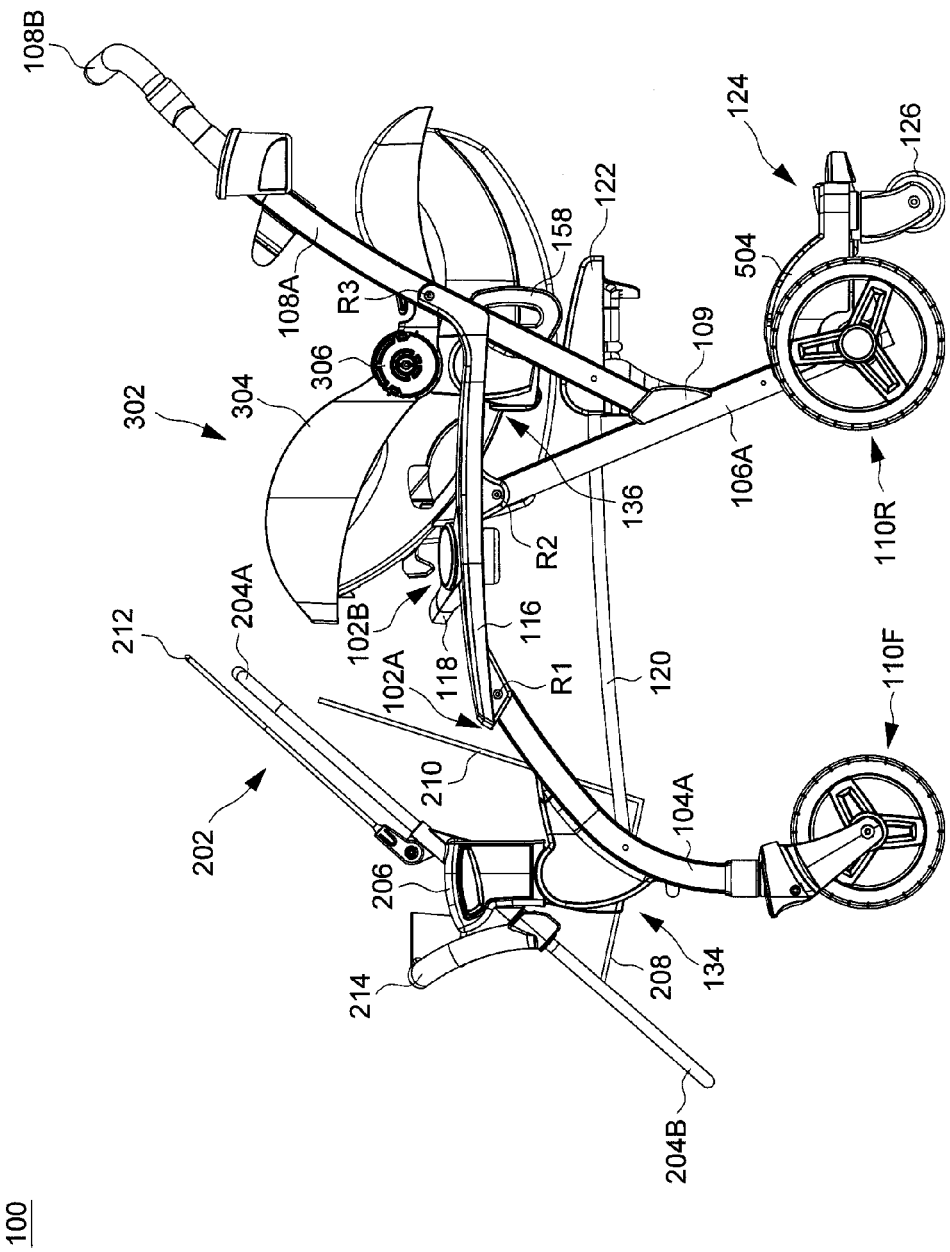
FIG. 13 is a schematic view illustrating another configuration of the infant stroller apparatus having one stroller seat installed in a front position facing forward and one infant car seat installed in a rear position facing rearward.

In FIG. 13, the infant stroller apparatus 100 is shown as having one stroller seat 202 engaged with the seat mounts 134 in the front seat area 102A, and one infant car seat 302 engaged with the seat mounts 136 in the rear seat area 102B. The stroller seat 202 is installed facing forward, whereas the infant car seat 302 is installed facing rearward.

Figure 14:
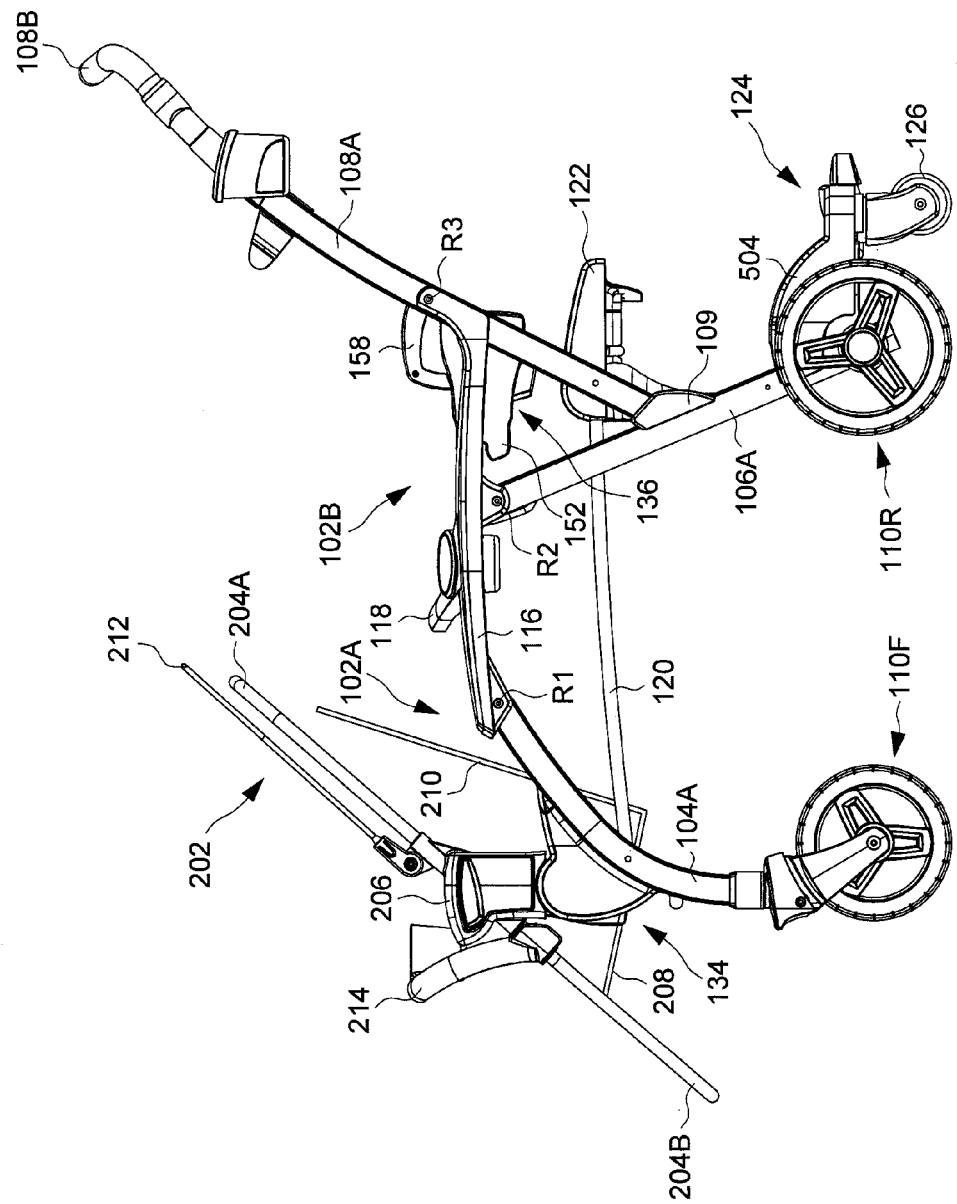
FIG. 14 is a schematic view illustrating another configuration of the infant stroller apparatus having one stroller seat installed in a front position facing forward.

In FIG. 14, the infant stroller apparatus 100 is shown as having one stroller seat 202 facing forward that is engaged with the seat mounts 134 in the front seat area 102A, whereas no seat is installed on the seat mounts 136 in the rear seat area 102B. In this configuration, an older child may sit on the bench seat 122, or stand on the stand platform 124. Moreover, the seat mounts 136 may be adjusted to the stowed state so that the handles 158 can protrude upward above the mount portions 152, so that the child sitting on the bench seat 122 or standing on the stand platform 124 facing forward can grasp the handles 158 for support.

Figure 15:
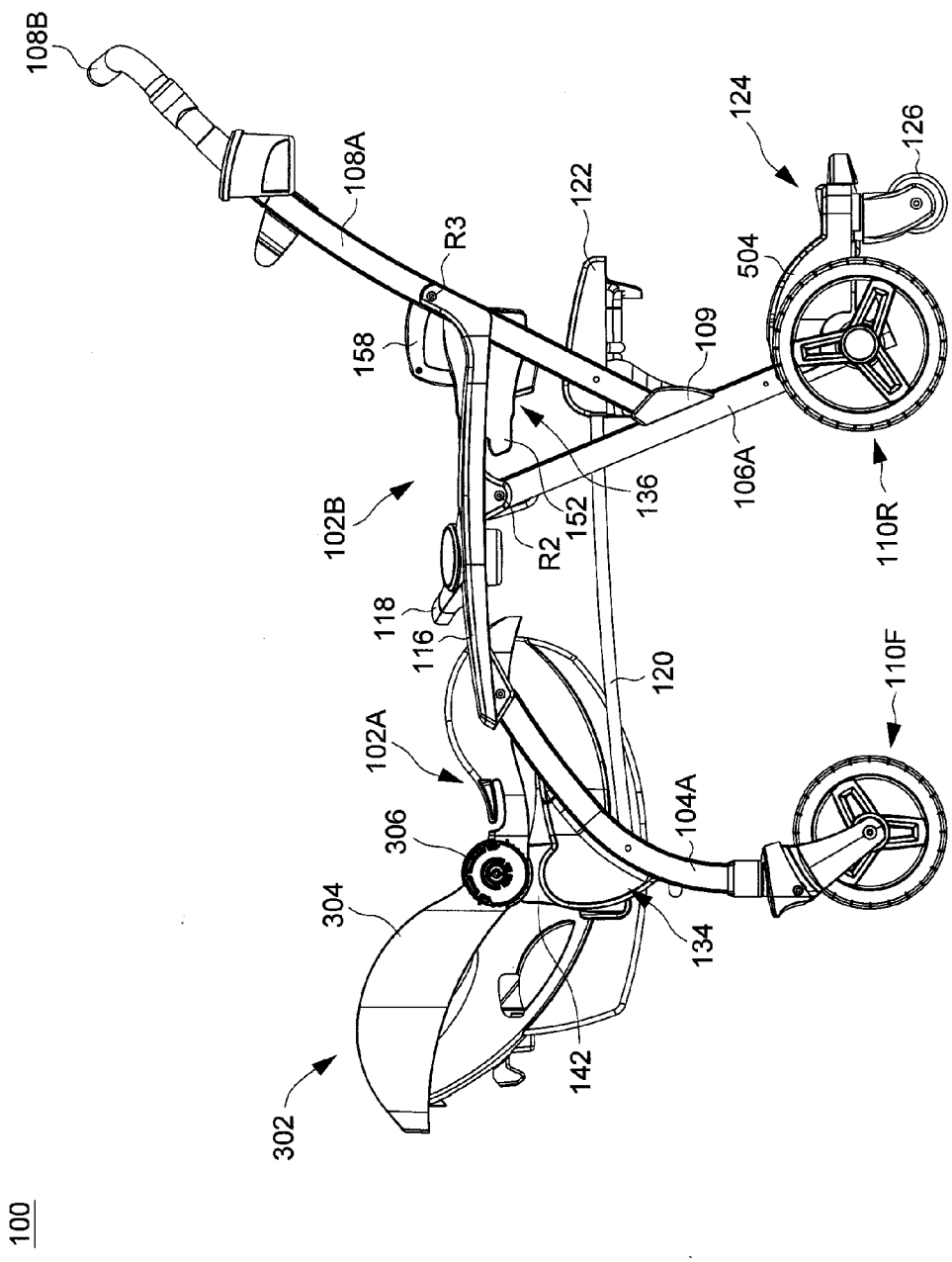
FIG. 15 is a schematic view illustrating another configuration of the infant stroller apparatus having one infant car seat installed in a front position facing rearward.

In FIG. 15, the infant stroller apparatus 100 is shown as having one infant car seat 302 that is arranged facing rearward and is engaged with the seat mounts 134 in the front seat area 102A, whereas no seat is installed on the seat mounts 136 in the rear seat area 102B. In this configuration, an older child may sit on the bench seat 122, or stand on the stand platform 124. Like previously described, the seat mounts 136 may be adjusted to the stowed state so that the handles 158 can protrude upward and be grasped by the child sitting on the bench seat 122 or standing on the stand platform 124 facing forward.

Figure 16:
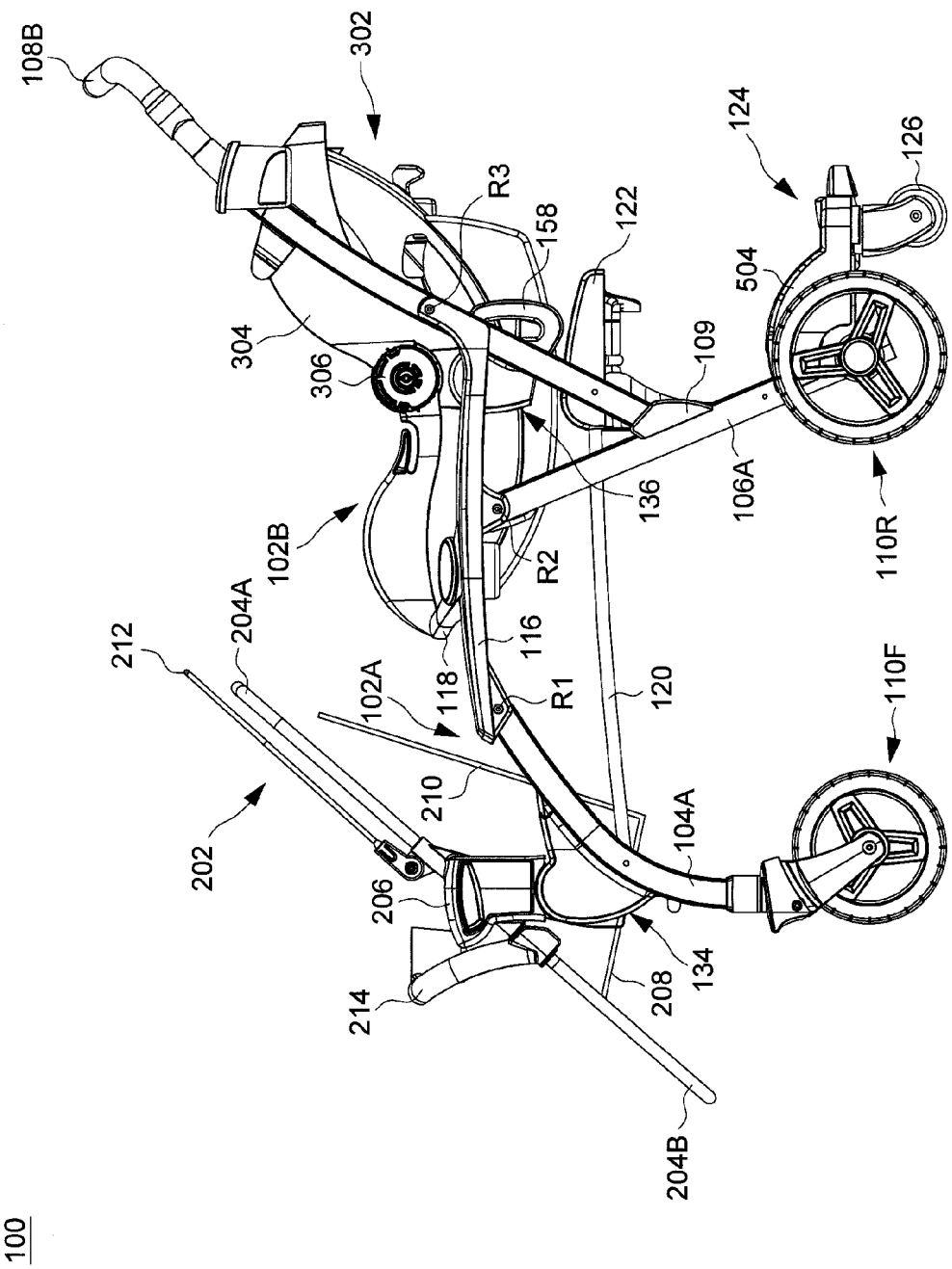
FIG. 16 is a schematic view illustrating another configuration of the infant stroller apparatus having one stroller seat installed in a front position facing forward, and one infant car seat installed in a rear position facing forward.

In FIG. 16, the infant stroller apparatus 100 is shown as having one stroller seat 202 engaged with the seat mounts 134 in the front seat area 102A, and one infant car seat 302 engaged with the seat mounts 136 in the rear seat area 102B. Both the stroller seat 202 and infant car seat 302 may be installed facing forward.

Figure 17:
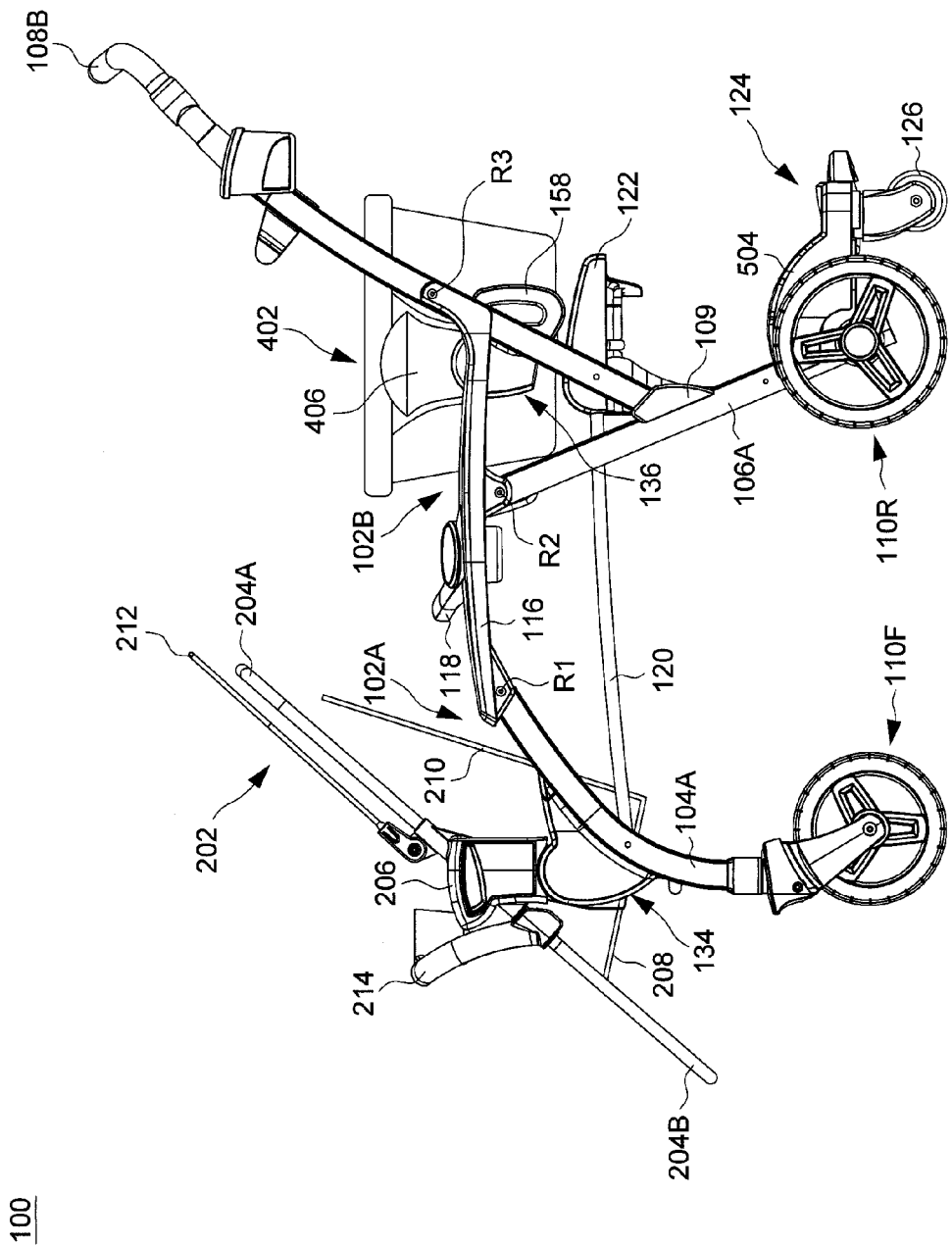
FIG. 17 is a schematic view illustrating a variant accessory item that can be detachably installed on the stroller frame.

While the foregoing has illustrated some examples of installing one or more seats on the stroller frame 102, it will be understood that other combinations or configurations of seats may be possible. Moreover, in addition to detachable seats, other types of accessory items may be configured so as to be installable on the seat mounts 134 or 136. For example, FIG. 17 is a schematic view illustrating an accessory item 402 that may have two opposite sides provided with suitable sockets 406 (which may be similar to the sockets 206 of the stroller frame 202 described previously) that are engageable with the seat mounts 134 or 136, thereby allowing its installation on the stroller frame 102. The accessory item 402 may include, without limitation, a carry cot, a bassinet, a pet carrier, a storage basket and the like. While the accessory item 402 is shown as being installed in the rear seat area 102B and engaged with the seat mounts 136, it may also be possible to place the accessory item 402 in the front seat area 102A engaged with the seat mounts 134.

Figure 18:
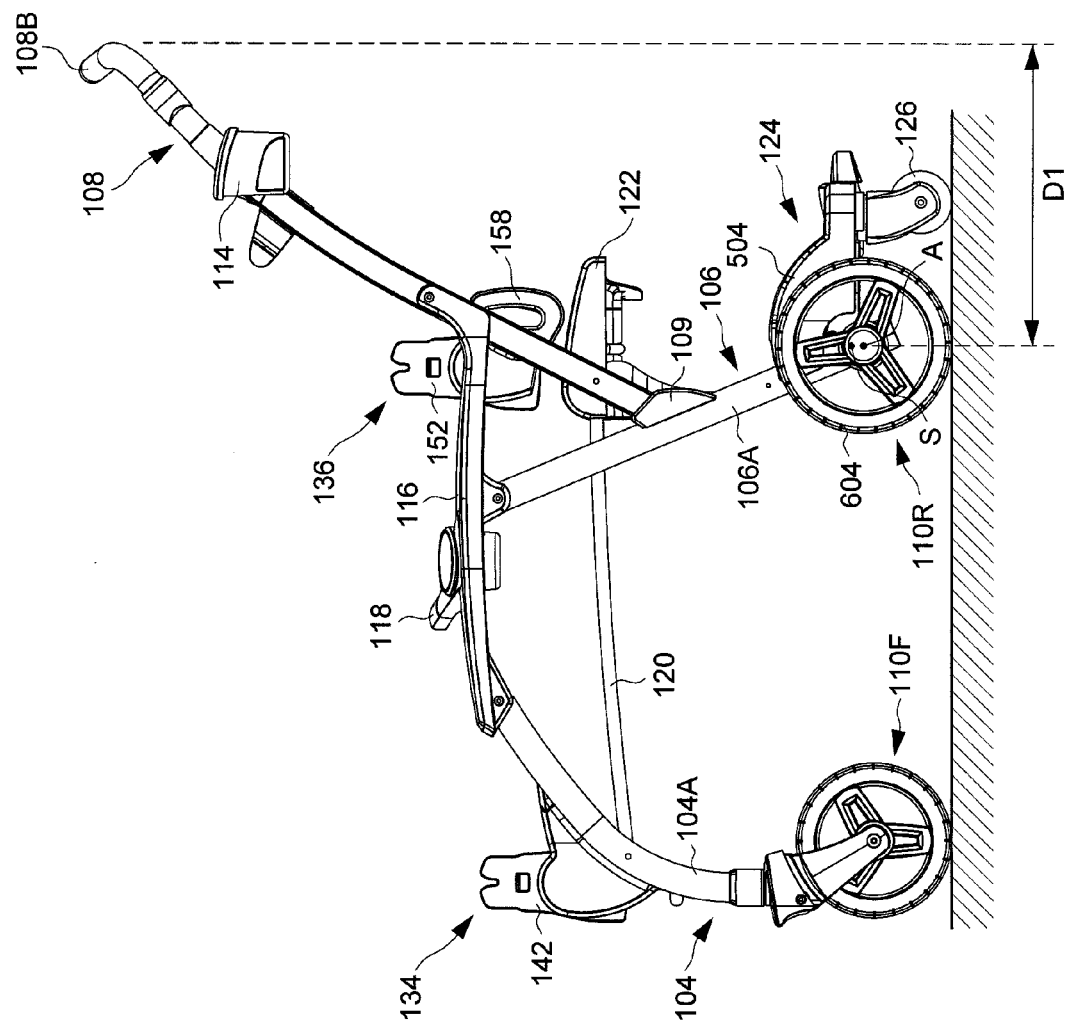
FIG. 18 is a schematic view illustrating the infant stroller apparatus having an increased horizontal distance between a rear end of a handle frame and a wheel axis of rear wheel assemblies.

FIG. 18 is a schematic view illustrating another advantageous aspect of the infant stroller apparatus 100 described herein. According to one embodiment, the infant stroller apparatus 100 can have an increased horizontal distance D1 between a rear end of the handle frame 108 and a wheel axis A of the wheel assemblies 110R provided on the rear leg frame 106. The increased distance D1 can create more leverage for a caregiver to turn the infant stroller apparatus 100, which can improve its maneuverability. Moreover, the stand platform 124 is pivotally connected with the leg frame 106, and is coupled with a spring 514 (better shown in FIG. 19) configured to bias the stand platform 124 downward. The spring force applied to the stand platform 124 is sufficiently strong to prevent the infant stroller apparatus 100 from tipping rearward when it stands in an inclined position, but is soft enough to allow a caregiver to press the transversal segment 108B downward and create leverage about the wheel axis A of the rear leg frame 106.

Figure 19:
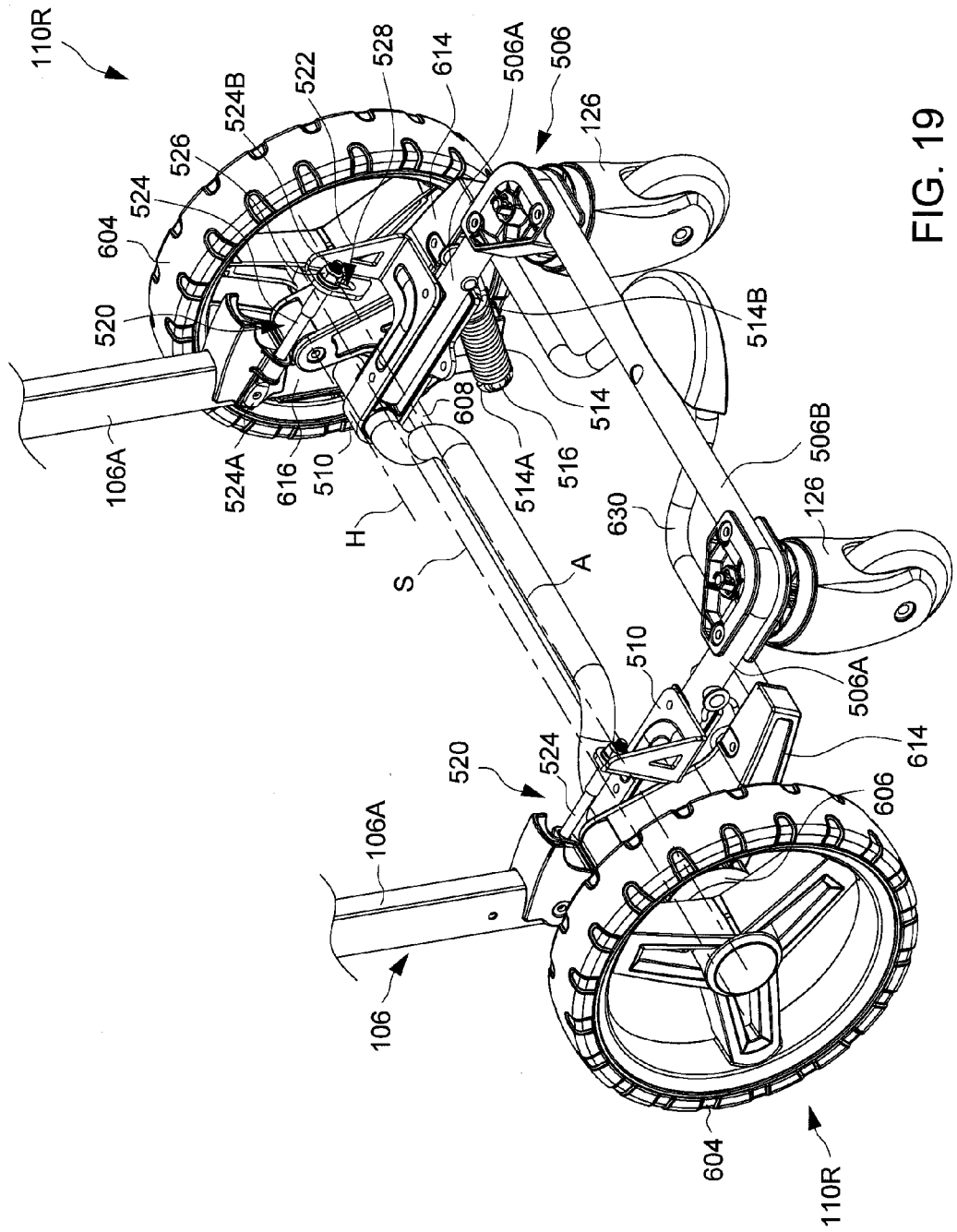
FIG. 19 is a schematic view illustrating construction details of a spring-biased stand platform provided in the infant stroller apparatus.

FIG. 19 is a schematic view illustrating further construction details of the stand platform 124. The stand platform 214 can include a support board 504 (better shown in FIGS. 1 and 18) and a support frame 506 affixed with each other. For better illustrating the construction of the stand platform 214, the support board 504 is omitted in FIG. 19. The support frame 506 can be formed by the assembly of one or multiple tube elements, and can have a generally U-shape including two side segments 506A and a transversal segment 506B affixed with the two side segments 506A. The two side segments 506A of the support frame 506 are respectively affixed with two brackets 510, and the two brackets 510 are pivotally connected with the transversal segment 106B of the rear leg frame 106 respectively adjacent to the two rear leg segments 106A at the left and right side of the stroller frame 102. The stand platform 124 is thereby pivotally connected with the transversal segment 106B of the rear leg frame 106 about a pivot axis S that extends substantially parallel to the wheel axis A of the wheel assemblies 110R from the left to right side of the stroller frame 102.

It will be understood that the pivot connection of the stand platform 124 with the rear leg frame 106 is not limited to the aforementioned example of assembly at the transversal segment 106B. The stand platform 124 may be pivotally connected with the rear leg frame 106 via any other suitable structures. For example, in some variant embodiments, the stand platform 124 may also be pivotally connected with the rear leg frame 106 about a wheel axle 608 of the two wheel assemblies 110R, or via pivotal hinges provided on the two rear leg segments 106A.

In the illustrated embodiment, two caster assemblies 126 are connected with the stand platform 124. However, some variant embodiments may have more or less caster assemblies 126 connected with the stand platform 124. The caster assemblies 126 are arranged at positions (e.g., at two corners of the U-shaped support frame 506) offset rearward relative to the pivot axis S of the stand platform 124 and the wheel axis A of the wheel assemblies 110R, i.e., toward the rear of the infant stroller apparatus 100. The pivot connection of the stand platform 124 about the transversal segment 106B allows the stand platform 124 and the caster assemblies 126 to rotate about the pivot axis S relative to the rear leg frame 106.

Referring to FIG. 19, each of the left and right sides of the stroller frame 102 can be respectively provided with a spring 514 configured to rotationally bias the stand platform 124 in a direction for displacing the caster assemblies 126 downward. The spring 514 can have a first end 514A connected with the rear leg frame 106, and a second end 514B connected with the stand platform 124 at a rearward location relative to the pivot axis S. In one embodiment, the spring 514 can be a drawing spring. At each of the left and right sides of the stroller frame 102, the first end 514A of the spring 514 can be connected with a post 516 (e.g., formed by a rivet) affixed with the rear leg segment 106A below the pivot axis S of the stand platform 124, and the second end 514B of the spring 514 can be affixed with one side segment 506A of the support frame 506 of the stand platform 124. The spring 514 can thereby rotationally bias the stand platform 124 and the caster assemblies 126 connected therewith in a downward direction toward a ground surface.

Figure 20:
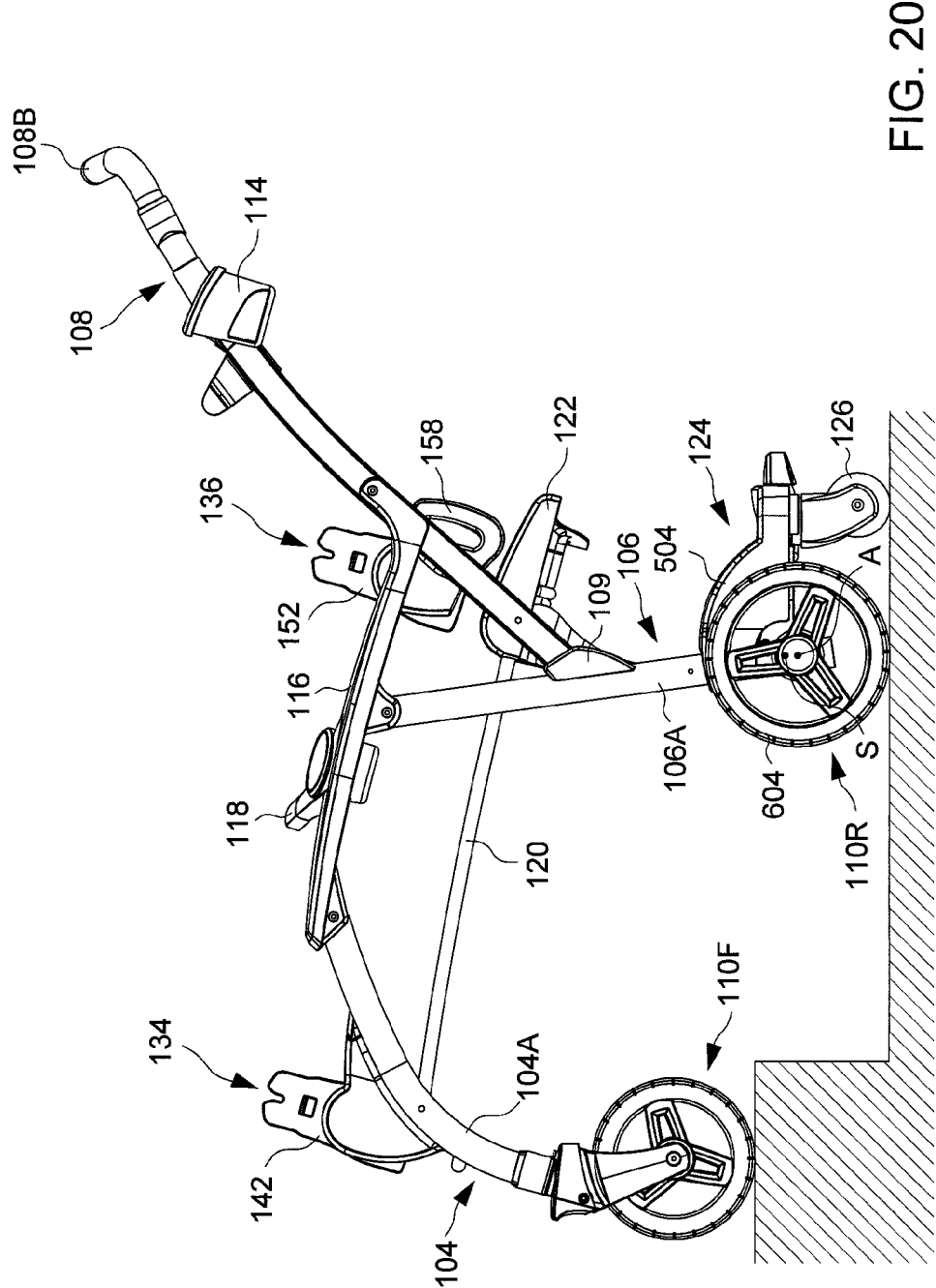
FIG. 20 is a schematic view illustrating the infant stroller apparatus inclined rearward.

When the infant stroller apparatus 100 stands in an inclined position with the front leg frame 104 thereof raised upward relative to the rear leg frame 106, the spring force applied by the spring 154 can prevent the infant stroller apparatus 100 from tipping rearward. Referring to FIG. 20, when a caregiver wants to ride the infant stroller apparatus 100 up a curb, the caregiver can push down the transversal segment 108B of the handle frame 108 so as to overcome the spring force of the spring 514. As a result, the stroller frame 102 rotates about the pivot axis S relative to the stand platform 124 to lift the wheel assemblies 110F of the front leg frame 104 above a ground surface, whereas the wheel assemblies 110R of the rear leg frame 108 and the caster assemblies 126 can remain in contact against the ground surface. Accordingly, the spring-loaded stand platform 124 can facilitate maneuverability of the infant stroller apparatus 100.

Referring again to FIG. 19, at one or two of the left and right sides, the stand platform 124 may further be connected with a limit adjustment mechanism 520 operable to adjust a lowermost angular position of the stand platform 124. The limit adjustment mechanism 520 can include a plate portion 522 affixed with the stand platform 124, and a threaded rod 524 and a nut 526 meshed with each other. In one embodiment, the plate portion 522 can be exemplary formed integrally with the bracket 510 that is affixed with the support frame 506. The plate portion 522 can rise above the support frame 506 at a rearward position relative to the pivot axis S of the stand platform 124, and can have an elongated slot 528 extending along a vertical direction. The threaded rod 524 can have a first end 524A affixed with the rear leg segment 106A, and a second end 524B opposite to the first end 524A projecting rearward through the elongated slot 528 of the plate portion 522. The nut 526 can be meshed with the threaded rod 524 in proximity of the second end 524B, the plate portion 522 being connected with the threaded rod 524 between the first end 524A thereof and the nut 526.

In the limit adjustment mechanism 520, the nut 526 can move along the threaded rod 524 to adjust a distance between the first end 524A of the threaded rod 524 and the nut 526. The stand platform 124 can rotate about the pivot axis S between a lowermost angular position where the plate portion 522 adjacently presses against the nut 526, and an uppermost angular position where a lower end of the elongated slot 528 abuts against the threaded rod 524. According to the position of the nut 526, the limit adjustment mechanism 520 thus can adjust a lowermost angular position of the stand platform 124 to ensure that the caster assemblies 126 can contact with a ground surface at the same level as the wheel assemblies 110R of the rear leg frame 106.

Figure 21:
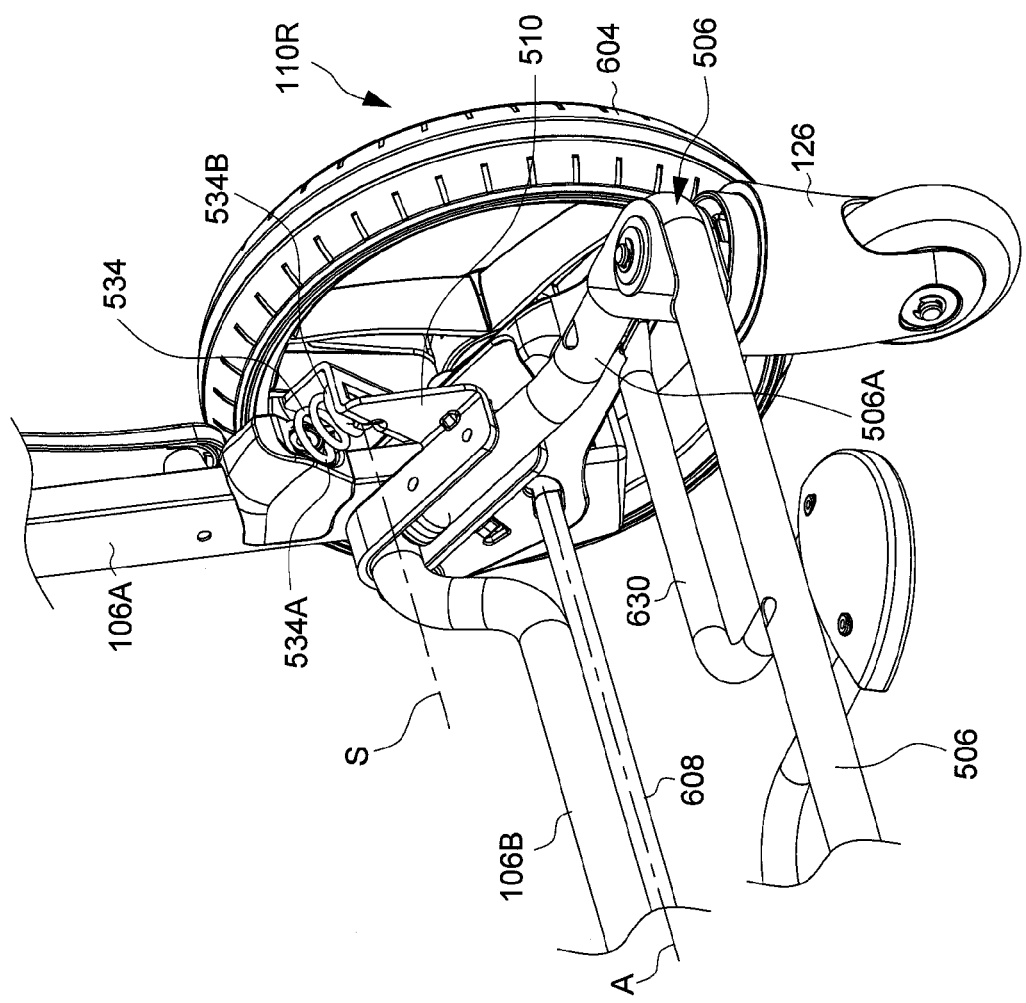
FIG. 21 is a schematic view illustrating a variant spring arrangement in the spring-biased stand platform.

While the aforementioned embodiment has described a specific assembly of the spring 514, it will be understood that the stand platform 124 may be assembled with other different spring arrangements. FIG. 21 is a schematic view illustrating another embodiment in which the stand platform 124 is connected with a spring 534 that replaces the spring 514 described previously. The spring 534 is exemplary a compression spring, and has a first and a second end 534A and 534B respectively connected with the rear leg segment 106A and the stand platform 124. The first end 534A of the spring 534 can be connected with the rear leg segment 106A above the pivot axis S of the stand platform 124, and the second end 534B of the spring 534 can be connected with the stand platform 124 at a rearward location relative to the pivot axis S (e.g., with a portion of the bracket 510 affixed with the support frame 506 of the stand platform 124). Like the spring arrangement previously described, the spring 534 can rotationally bias the stand platform 124 and the caster assemblies 126 connected therewith in a downward direction toward a ground surface.

Figure 22:
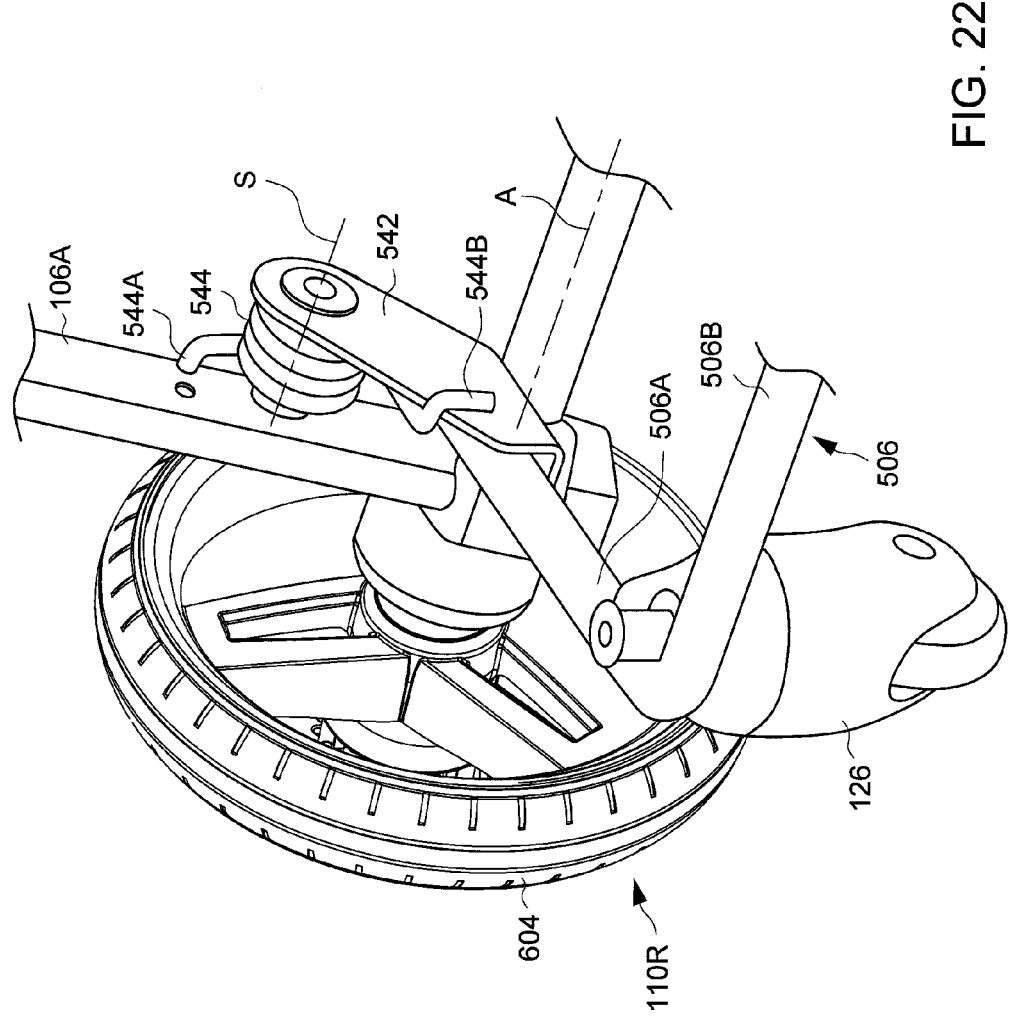
FIG. 22 is a schematic view illustrating another spring arrangement in the spring-biased stand platform.

FIG. 22 is a schematic view illustrating another variant embodiment of a spring arrangement that is connected with the stand platform 124. In the embodiment of FIG. 22, the spring arrangement includes a torsion spring 544 that is arranged around the pivot axis S and has a first and a second end 544A and 544B respectively connected with the rear leg segment 106A and the stand platform 124. Moreover, the stand platform 124 is not pivotally connected with the transversal segment 106B of the rear leg frame 106 in the embodiment of FIG. 22. Rather, each the two side segments 506A of the support frame 506 is respectively affixed with a bracket 542 that extends upward from the support frame 506, and the bracket 542 is pivotally connected with the rear leg segment 106A about the pivot axis S above the support frame 506. The first end 544A of the torsion spring 544 can be connected with the rear leg segment 106A, and the second end 544B of the torsion spring 544 can be connected with the bracket 542. Like the spring arrangements previously described, the torsion spring 544 can rotationally bias the stand platform 124 and the caster assemblies 126 connected therewith in a downward direction toward a ground surface.

Figure 23:
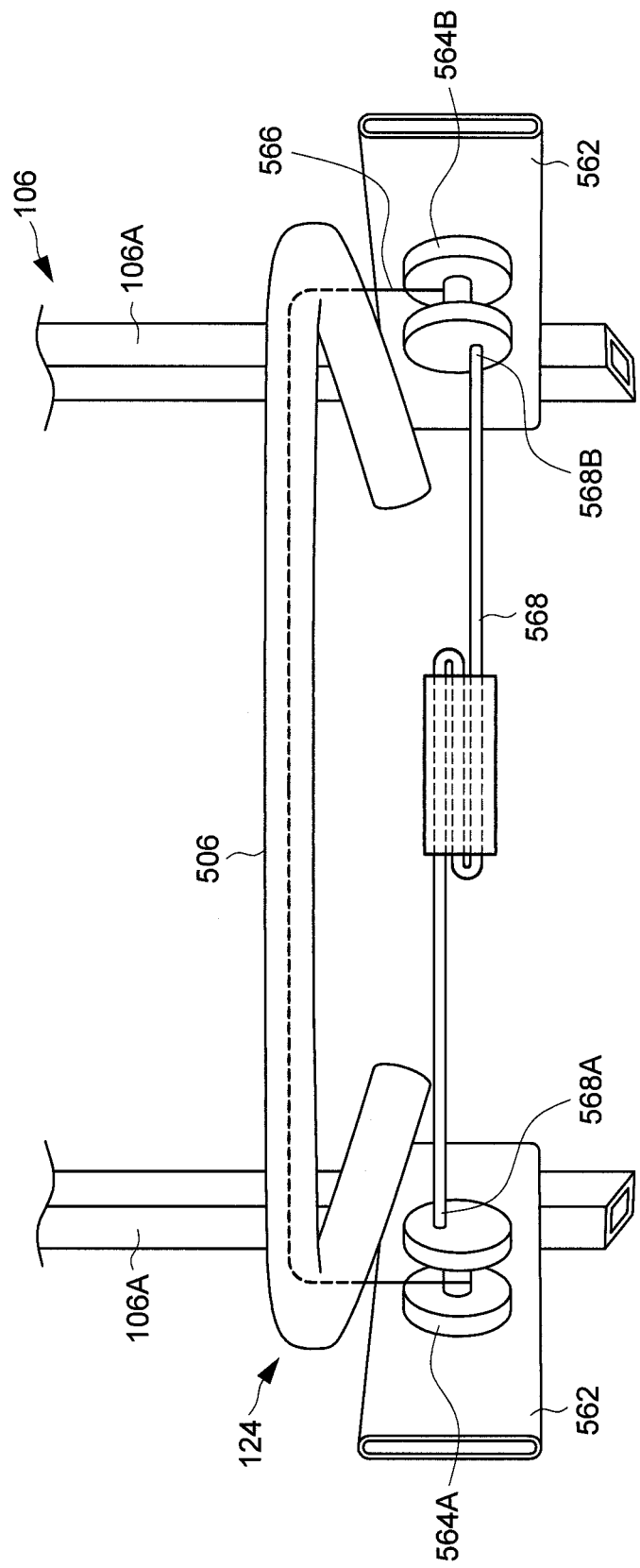
FIG. 23 is a schematic view illustrating another construction for biasing the stand platform downward.
Figure 24:
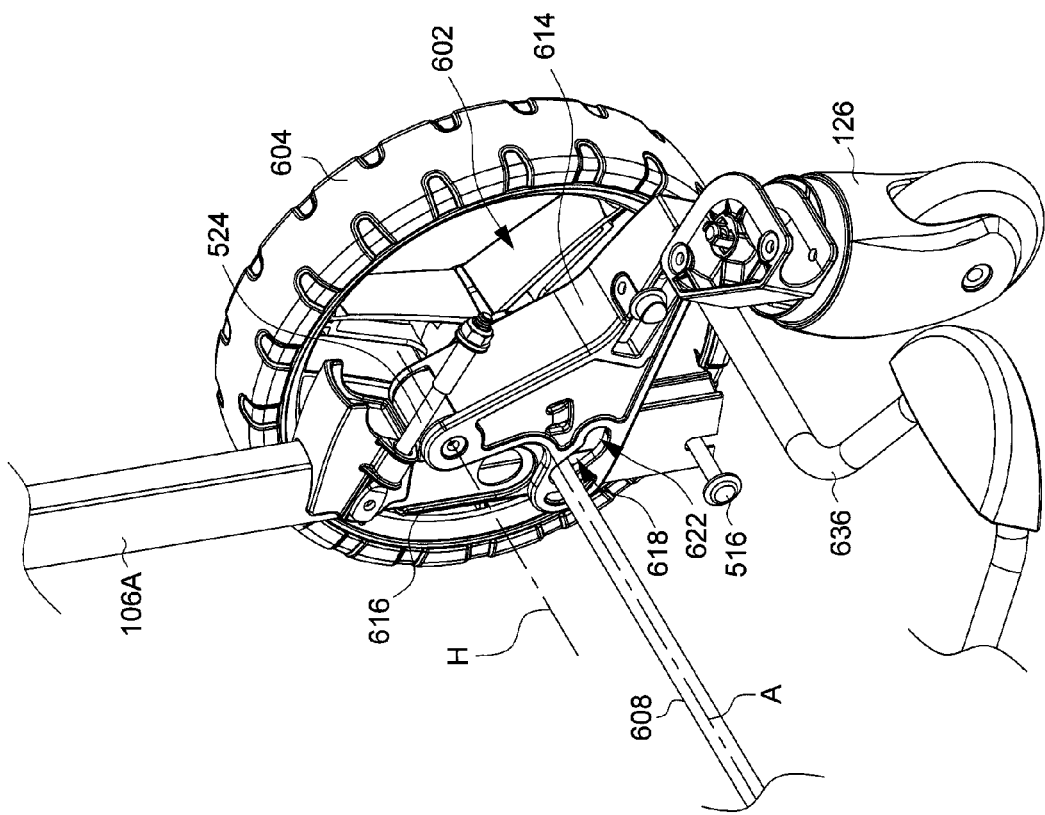
FIG. 24 is a schematic view illustrating a brake assembly that can be provided at each of a left and a right side of a rear leg frame of the infant stroller apparatus.
Figure 25:
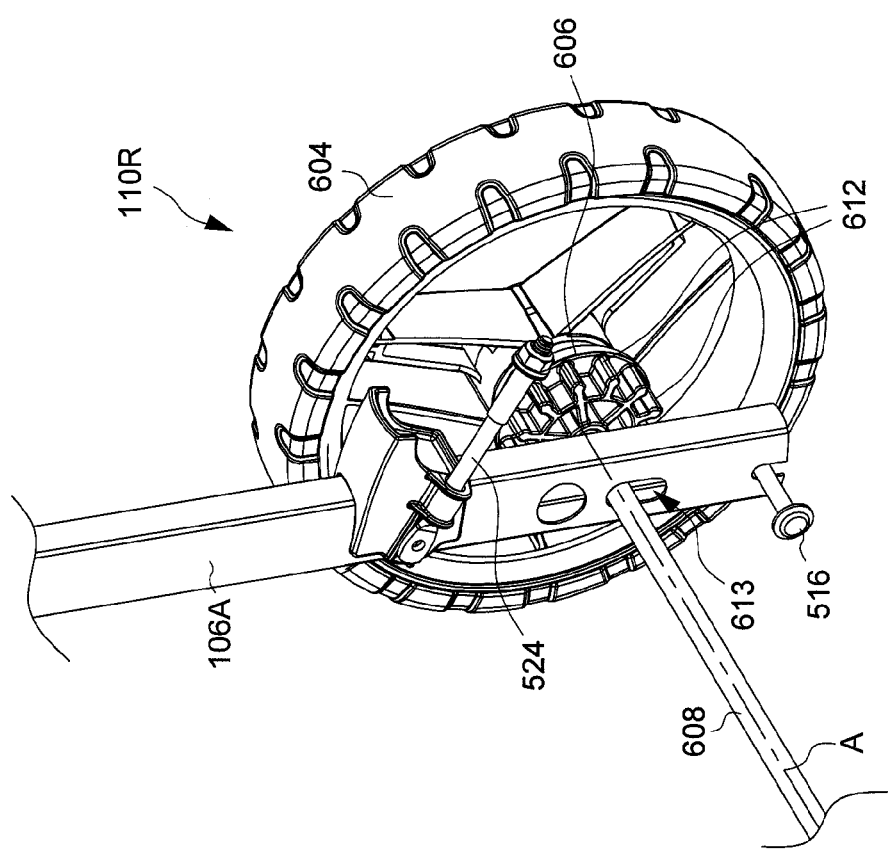
FIG. 25 is a schematic view illustrating a portion of the brake assembly shown in FIG. 24 omitting the representation of an actuator.
Figure 26:
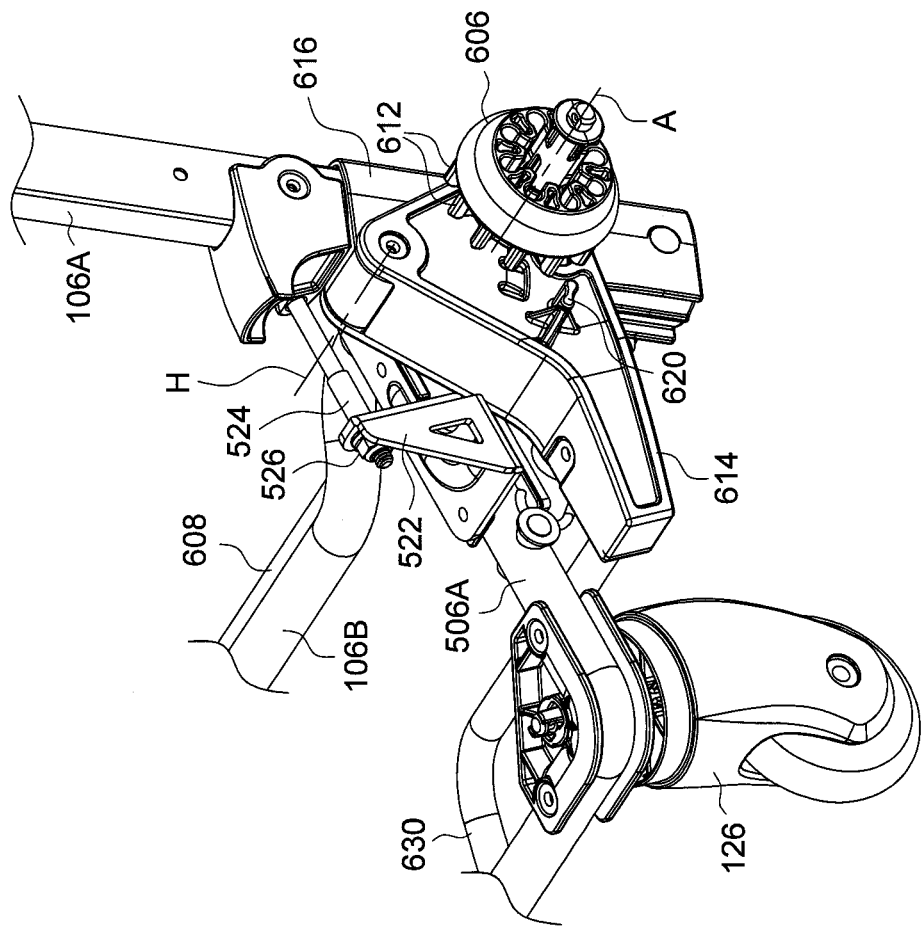
FIG. 26 is another schematic view illustrating certain construction details of the brake assembly shown in FIG. 24.

FIG. 23 is a schematic view illustrating another possible construction for biasing the stand platform 124 (and the caster assemblies 126) downward. In FIG. 23, some portion of the stand platform 124 is omitted (in particular the support board 504 thereof), and only the support frame 506 of the stand platform 124 is shown for clarity. The embodiment shown in FIG. 23 can include two brackets 562 that are respectively affixed with the two rear leg segments 106A of the rear leg frame 106, two pulleys 564A and 564B, a cable assembly 566 and a torsion spring 568. The two brackets 562 can be arranged near the support frame 506 of the stand platform 124. The two pulleys 564A and 564B can be respectively connected pivotally with the two brackets 562 below the support frame 506 at the left and right sides of the rear leg frame 106. The cable assembly 566 can have an intermediate portion connected with the stand platform 124 (e.g., by wrapping around an upper side of the support frame 506), and two opposite ends respectively anchored with the two pulleys 564A and 564B. The torsion spring 568 can extend transversally, and have two opposite ends 568A and 568B respectively connected with the two pulleys 564A and 564B. The torsion spring 568 is rotationally loaded in opposite directions at the two opposite ends 568A and 568B so as to bias rotation of the two pulleys 564A and 564B in opposite directions. Under the biasing action of the torsion spring 568, the two pulleys 564A and 564B can pull on the cable assembly 566 so as to draw the stand platform 124 downward.

In conjunction with FIG. 19, FIGS. 24-26 are schematic views illustrating detailed construction of a brake assembly 602 that can be provided at each of the left and right sides of the rear leg frame 106 in association with one corresponding wheel assembly 110R. Referring to FIGS. 19 and 24-26, the brake assembly 602 can be operable to block rotation of the wheel assembly 110R. In one embodiment, the wheel assembly 110R can include a wheel 604 and a wheel hub 606 that are affixed with each other. Both the wheel 604 and the wheel hub 606 are pivotally connected about a wheel axle 608 that defines a common wheel axis A of the two wheel assemblies 110R. The wheel axle 608 can be movably assembled with the rear leg frame 106. For example, each of the two leg segments 106A can include a guide slot 613 (better shown in FIG. 25) having an elongated shape, and the wheel axle 608 is arranged through the guide slot 613 and can slide up and down along the guide slot 613 relative to the rear leg segment 106A. The wheel axle 608 is arranged forward relative to the caster assemblies 126 of the stand platform 124.

Referring to FIGS. 19 and 24-26, the brake assembly 602 can include a plurality of brake cogs 612 that are affixed with the wheel hub 606, and an actuator 614 movably assembled with the rear leg segment 106A of the rear leg frame 106. For clarity, the representation of the actuator 614 is omitted in FIG. 25. The brake cogs 612 can be distributed around the wheel axle 608, and can project at a side of the wheel hub 606 adjacent to the actuator 614.

The actuator 614 can be provided as a unitary part that is pivotally connected with the rear leg segment 106A. In one embodiment, the rear leg segment 106A can be affixed with a bracket 616, and the actuator 614 can be pivotally connected with the bracket 616 about a pivot axis H located above the wheel axle 608. The bracket 616 can also have a guide slot 618 (shown in FIG. 24) corresponding to the guide slot 613 of the leg segment 106A for passage of the wheel axle 608. The actuator 614 includes a latching portion 620 that is disposed eccentric from the pivot axis H and can engage with any of the brake cogs 612 of the wheel hub 606. Moreover, the actuator 614 includes a cam slot 622 through which is slidably arranged the wheel axle 608. The cam slot 622 can be arranged offset from the pivot axis H of the actuator 614, and partially overlaps with the guide slot 613 of the rear leg segment 106A. This assembly allows to drive upward and downward displacement of the wheel axle 608 along the guide slots 613 and 618 by rotating the actuator 614.

Referring again to FIGS. 19 and 24, the two actuators 614 at the left and right sides of the rear leg frame 106 can be linked via each other via a transversal bar linkage 630. Accordingly, a caregiver can operate the transversal bar linkage 630 to drive concurrent movement of the actuators 614 of the two brake assemblies 602.

Figure 27:
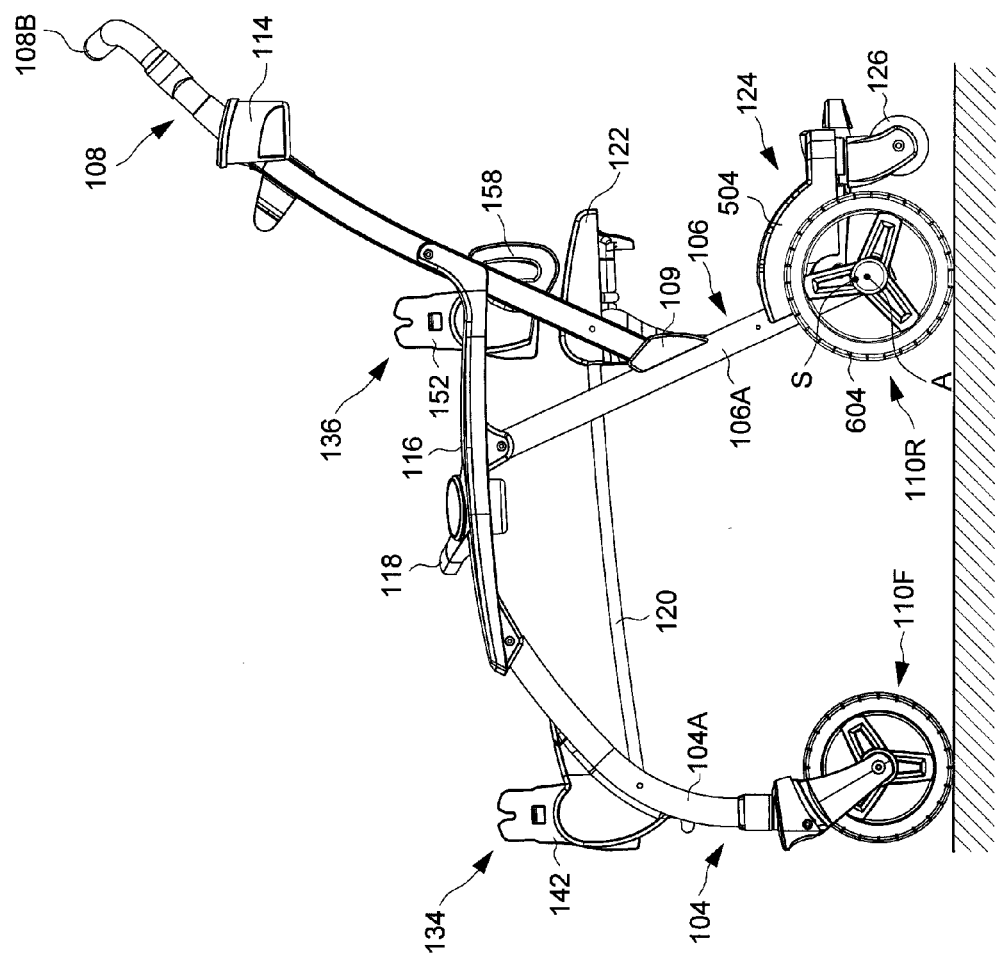
FIG. 27 is a schematic view illustrating the brake assembly in a braking state with caster assemblies of the stand platform lifted above a ground surface.

With the aforementioned construction, the actuator 614 can selectively rotate about the pivot axis H relative to the rear leg frame 106 to engage with any of the brake cogs 612 on the wheel hub 606 to block rotation of the wheel 604 relative to the rear leg frame 106, and to disengage from the brake cogs 612 to allow rotation of the wheel 604 relative to the rear leg frame 106. In addition, the rotation of the actuator 614 relative to the rear leg frame 106 can concurrently cause relative sliding of the wheel axle 608 along the cam slot 622 and the guide slot 613, which results in a displacement of the rear leg frame 106 along with the stand platform 124 and the caster assemblies 126 relative to the wheel axle 608 between an upper position and a lower position. More specifically, a rotation of the actuator 614 to the braking state (i.e., for engaging the latching portion 620 of the actuator 614 with one brake cog 612 of the wheel hub 606) causes the rear leg frame 106 to switch to the upper position and lift the caster assemblies 126 above a ground surface. While the wheel assemblies 110F of the rear leg frame 106 are in the braking state, lifting the caster assemblies 126 of the stand platform 124 above the ground surface can provide better braking effects and prevent movement of the infant stroller apparatus 100. The lifted state of the caster assemblies 126 is schematically shown in FIG. 27.

A reverse rotation of the actuator 614 to the release state (i.e., for disengaging the latching portion 620 of the actuator 614 from the brake cogs 612 of the wheel hub 606) causes the rear leg frame 106 to switch to the lower position to lower and cause the caster assemblies 126 to contact with the ground surface (e.g., such as illustrated in FIG. 18.

While the brake assembly 602 and the spring-loaded stand platform 124 described herein may be associated in a same embodiment of an infant stroller apparatus, it will be understood that they may also be implemented separately. For example, the brake assembly 602 may be implemented in an infant stroller apparatus that has a stand platform fixedly assembled with the rear leg frame 106. In another embodiment, an infant stroller apparatus may implement the spring-loaded stand platform 124 without the brake assembly 602 described herein.

Advantages of the infant stroller apparatus described herein include the ability to provide a stroller frame that can receive multiple detachable seats in different configurations. Moreover, the stroller frame can have a spring-loaded stand platform that provides standing support and facilitates maneuverability of the infant stroller apparatus, and a brake assembly that can be operable to lift the caster assemblies of the stand platform in a braking state to prevent movement of the infant stroller apparatus.

Realization of the infant stroller apparatus has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. An infant stroller apparatus comprising:
   a stroller frame including a leg frame, the leg frame being connected with a wheel assembly having a wheel axis;
   a stand platform pivotally connected with the leg frame about a pivot axis, the stand platform being connected with a caster assembly disposed rearward relative to the pivot axis, the caster assembly being located rearward relative to the wheel axis; and
   a spring connected with the leg frame and configured to bias the stand platform in a direction for displacing the caster assembly downward.

2. The infant stroller apparatus according to claim 1, wherein the leg frame includes two leg segments respectively disposed at a left and a right side of the stroller frame, and a transversal segment connected with the two leg segments, the stand platform having a bracket that is pivotally connected with the transversal segment.

3. The infant stroller apparatus according to claim 1, wherein the spring has a first end connected with the leg frame, and a second end connected with the stand platform at a rearward location relative to the pivot axis.

4. The infant stroller apparatus according to claim 3, wherein the leg frame includes two leg segments respectively disposed at a left and a right side of the stroller frame, and the first end of the spring is connected with one of the two leg segments at a location above the pivot axis.

5. The infant stroller apparatus according to claim 3, wherein the leg frame includes two leg segments respectively disposed at a left and a right side of the stroller frame, and the first end of the spring is connected with one of the two leg segments at a location below the pivot axis.

6. The infant stroller apparatus according to claim 1, wherein the spring is a torsion spring.

7. The infant stroller apparatus according to claim 1, further including a limit adjustment mechanism operable to adjust a lowermost angular position of the stand platform.

8. The infant stroller apparatus according to claim 1, wherein the wheel assembly includes a wheel axle movably assembled with the leg frame, the leg frame being movable with the stand platform and the caster assembly relative to the wheel axle between an upper position and a lower position.

9. The infant stroller apparatus according to claim 8, wherein the caster assembly is lifted above a ground when the leg frame is in the upper position.

10. The infant stroller apparatus according to claim 8, wherein the leg frame includes a guide slot through which the wheel axle is arranged, and the leg frame is assembled with an actuator, the actuator being operable to drive a relative displacement of the wheel axle along the guide slot for switching the leg frame between the upper position and the lower position.

11. The infant stroller apparatus according to claim 10, wherein the actuator is pivotally connected with the leg frame and includes a cam slot through which is arranged the wheel axle, a rotation of the actuator causing a relative displacement of the wheel axle along the cam slot and the guide slot.

12. The infant stroller apparatus according to claim 10, wherein the wheel assembly includes a wheel hub pivotally connected with the wheel axle, and the actuator is operable to engage with the wheel hub to block rotation of the wheel hub relative to the leg frame, and to disengage from the wheel hub to allow rotation of the wheel hub relative to the leg frame.

13. The infant stroller apparatus according to claim 12, wherein the actuator is engaged with the wheel hub when the leg frame is in the upper position, and the actuator is disengaged from the wheel hub when the leg frame is in the lower position.

14. An infant stroller apparatus comprising:
    a stroller frame including a leg frame;
    a stand platform connected with the leg frame, the stand platform being connected with a caster assembly;
    a wheel assembly connected with the leg frame, the wheel assembly including a wheel axle movably assembled with the leg frame, the leg frame being movable with the stand platform and the caster assembly relative to the wheel axle between an upper position and a lower position; and
    an actuator assembled with the leg frame, the actuator being operable to drive a displacement of the leg frame relative to the wheel axle for switching between the upper position and the lower position.

15. The infant stroller apparatus according to claim 14, wherein the caster assembly is lifted above a ground surface when the leg frame is in the upper position.

16. The infant stroller apparatus according to claim 14, wherein the leg frame includes a guide slot through which the wheel axle is arranged, and the actuator is operable to cause a relative displacement of the wheel axle along the guide slot for switching the leg frame between the upper position and the lower position.

17. The infant stroller apparatus according to claim 16, wherein the actuator is pivotally connected with the leg frame and includes a cam slot through which is arranged the wheel axle, a rotation of the actuator causing a relative displacement of the wheel axle along the cam slot and the guide slot.

18. The infant stroller apparatus according to claim 14, wherein the wheel assembly includes a wheel hub pivotally connected with the wheel axle, and the actuator is operable to engage with the wheel hub to block rotation of the wheel hub relative to the leg frame, and to disengage from the wheel hub to allow rotation of the wheel hub relative to the leg frame.

19. The infant stroller apparatus according to claim 18, wherein the actuator is engaged with the wheel hub when the leg frame is in the upper position, and the actuator is disengaged from the wheel hub when the leg frame is in the lower position.

20. The infant stroller apparatus according to claim 18, wherein the actuator has a latching portion, and the wheel hub has a plurality of brake cogs arranged around the wheel axle, the latching portion engaging with at least one brake cog to block rotation of the wheel hub relative to the leg frame.

21. The infant stroller apparatus according to claim 14, wherein the wheel axle is arranged forward relative to the caster assembly.

22. The infant stroller apparatus according to claim 14, wherein the stand platform is pivotally connected with the leg frame.

23. The infant stroller apparatus according to claim 22, further including a spring respectively connected with the stand platform and the leg frame, the spring being configured to bias the stand platform in a direction for displacing the caster assembly downward.

* * * * *